United States Patent [19]
Yuyama et al.

[11] Patent Number: 5,854,662
[45] Date of Patent: Dec. 29, 1998

[54] DRIVER FOR PLANE FLUORESCENT PANEL AND TELEVISION RECEIVER HAVING LIQUID CRYSTAL DISPLAY WITH BACKLIGHT OF THE PLANE FLUORESCENT PANEL

[75] Inventors: Masami Yuyama; Noriyasu Murata; Yoshimata Yasui, all of Tokyo, Japan

[73] Assignee: Casio Computer Co., Ltd., Tokyo, Japan

[21] Appl. No.: 696,001

[22] Filed: Aug. 12, 1996

Related U.S. Application Data

[62] Division of Ser. No. 459,183, Jun. 2, 1995, abandoned, which is a division of Ser. No. 66,547, May 24, 1993, abandoned.

[30] Foreign Application Priority Data

| Jun. 1, 1992 | [JP] | Japan | 4-140497 |
| Jun. 16, 1992 | [JP] | Japan | 4-183239 |
| Oct. 9, 1992 | [JP] | Japan | 4-271314 |
| Oct. 14, 1992 | [JP] | Japan | 4-276007 |
| Oct. 14, 1992 | [JP] | Japan | 4-276008 |
| Dec. 2, 1992 | [JP] | Japan | 4-322853 |

[51] Int. Cl.$^6$ .................................................. H04N 5/67
[52] U.S. Cl. ........................ 348/790; 348/792; 345/102
[58] Field of Search .................................. 348/794, 790, 348/791, 761, 766, 759, 795, 838, 792, 744, 739, 500, 510, 536, 803, 800; 345/102; 350/50; H04N 5/70, 5/67, 9/36

[56] References Cited

U.S. PATENT DOCUMENTS

| 4,234,821 | 11/1980 | Kako et al. . |
| 4,366,504 | 12/1982 | Kanatani . |
| 4,562,478 | 12/1985 | Hirasawa et al. . |
| 4,581,654 | 4/1986 | Kobayashi et al. ................. 348/790 |
| 4,672,448 | 6/1987 | Gioiosa . |
| 4,916,580 | 4/1990 | Sano et al. . |
| 4,975,692 | 12/1990 | Tateyama . |
| 5,006,933 | 4/1991 | Suzuki et al. . |
| 5,184,117 | 2/1993 | Gauthier . |

FOREIGN PATENT DOCUMENTS

| 63-100782 | 6/1988 | Japan . |
| 63-241525 | 10/1988 | Japan . |
| 63-184552 | 11/1988 | Japan . |
| 2-56593 | 2/1990 | Japan . |
| 2-244552 | 9/1990 | Japan . |
| 2-282220 | 11/1990 | Japan . |
| 3-170910 | 7/1991 | Japan . |
| 2 147 765 A | 5/1985 | United Kingdom . |

*Primary Examiner*—Nathan J. Flynn
*Attorney, Agent, or Firm*—Frishauf, Holtz, Goodman, Langer & Chick

[57] ABSTRACT

A driver is provided for driving a plane fluorescent panel as a backlight source in a small liquid crystal television receiver. The panel is driven with a pulse signal controlled such that a first edge of the pulse signal which is a rise or fall edge of the pulse signal is within a front porch of a horizontal blanking period of a video signal and that a second edge of the pulse signal which is a fall or rise edge of the pulse signal is within the width of a horizontal synchronous pulse to thereby drive the fluorescent panel efficiently to provide a stabilized light emission and render it difficult for noise in the fluorescent panel to enter the display of the television receiver. A small liquid crystal television receiver with a plane fluorescent panel driven so is also provided.

5 Claims, 18 Drawing Sheets

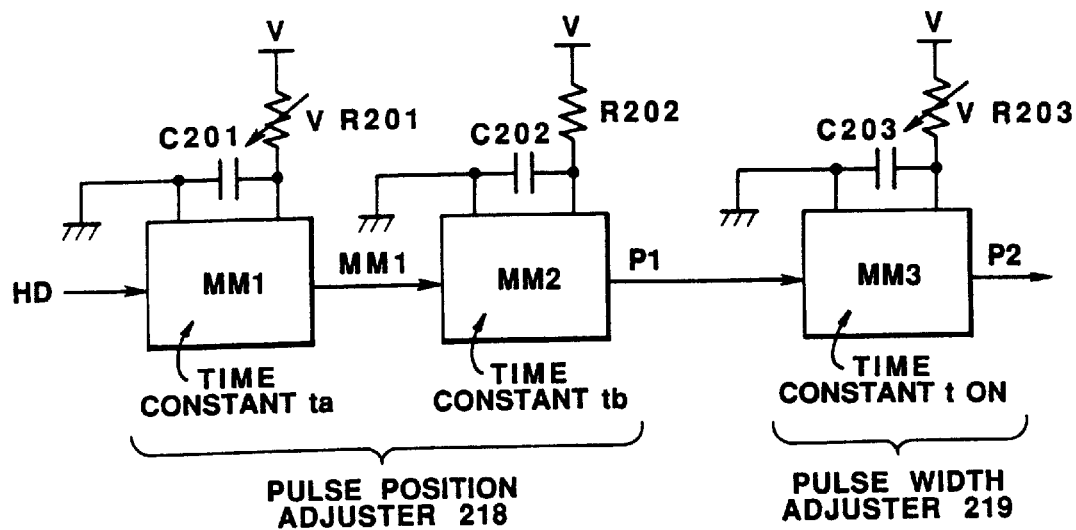
FIG.8
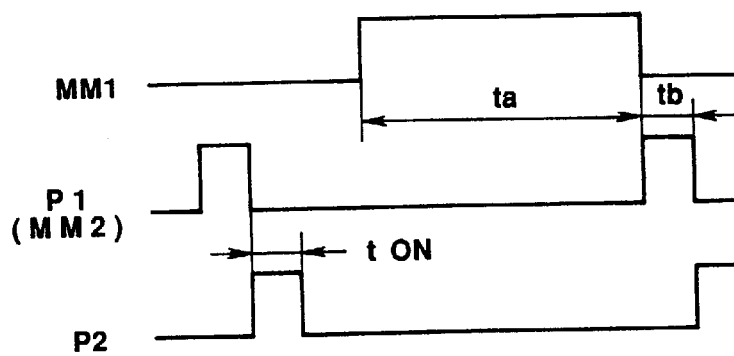
FIG.9(1)
FIG.9(2)
FIG.9(3)
FIG.9(4)

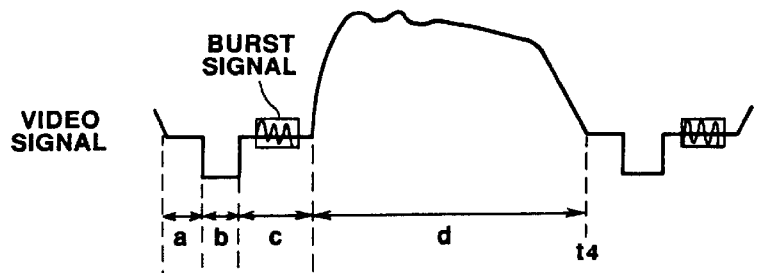
FIG.10(1) VIDEO SIGNAL
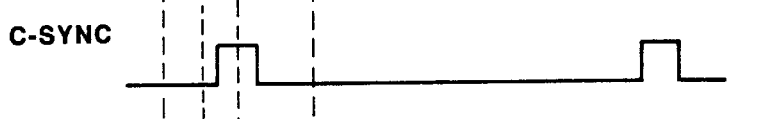
FIG.10(2) C-SYNC
FIG.10(3) HD
FIG.10(4) P1
FIG.10(5) P2
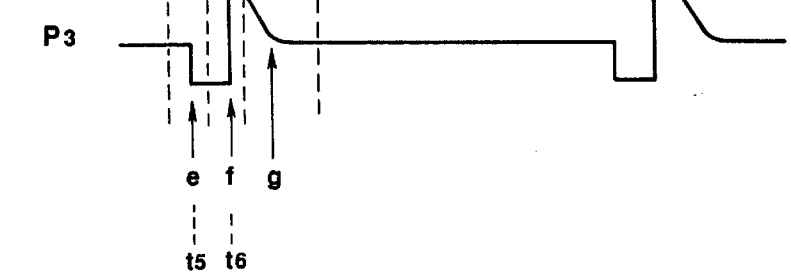
FIG.10(6) P3

DRIVER FOR PLANE FLUORESCENT PANEL AND TELEVISION RECEIVER HAVING LIQUID CRYSTAL DISPLAY WITH BACKLIGHT OF THE PLANE FLUORESCENT PANEL

This is a division of application Ser. No. 08/459,183; filed Jun. 2, 1993, now abandonded which is a Division of Ser. No. 08/066,547 filed May 24, 1993, now abandoned.

BACKGROUND OF THE INVENTION

1. Field of the Invention

The present invention relates to a driver for a plane fluorescent panel and a television receiver having a liquid crystal display with a backlight of the plane fluorescent panel.

2. Description of the Prior Art

Recently, liquid crystal television receivers with a liquid crystal display panel as a display have been put to practical use. The liquid crystal panel is thin and consumes only a small quantity of power to thereby provide a pocketable liquid crystal television receiver. The liquid crystal display panel, however, is a light receiving device, so that it requires a backlight for illuminating purposes.

Conventionally, a cylindrical or U-like fluorescent tube such as is disclosed in U.S. Pat. No. 4,916,580 is employed as the backlight in a liquid crystal receiver. It is provided with a reflector after the tube and a diffuser before the tube. Thus, the thickness of the overall assembly of the tube, reflector and diffuser is considerable, which is an obstacle to miniaturization and thinning of the television receiver. Although the diffuser is intended to provide uniform light, the tube takes the form of a U or a rod. Thus, the region where the fluorescent tube is positioned would be brighter than other regions; that is, uneven strength of light would occur undesirably.

Plane type fluorescent tubes (hereafter, referred to as plane fluorescent panel) have been developed which are, for example, disclosed in published unexamined Japanese patent applications Hei. 2-244552 and published unexamined Japanese utility model application Sho. 63-184552. These panels each are provided with a pair of slightly spaced flat plates coated with a fluorescent material and a pair of parallel electrodes provided between those plates. Electric discharge is generated across those electrodes to thereby produce an ultraviolet radiation, which excites the fluorescent material. This generates light to provide uniform brightness for the overall plane. This panel has a plane-like light emission unit to thereby provide uniform light.

In order to stabilize the light emission, it is said that such plane fluorescent panel is preferably supplied with a voltage which is interrupted at predetermined periods. For example, published unexamined Japanese patent applications Hei. 2-56593, 2-282220 and 3-170910 disclose that a pair of parallel electrodes of the plane fluorescent panel is supplied with a drive voltage pulse.

However, such plane fluorescent panel is easy to produce uneven light emission because the discharge position on the pair of discharge electrodes is not fixed and the panel is highly dependent on its ambient temperature.

When the plane fluorescent panel is used as the backlight for a liquid crystal television receiver, noise from the panel is easy to appear in the display picture due to the use of a pulse-like drive voltage.

SUMMARY OF THE INVENTION

The present invention is made in view of the above problems. It is an object of the present invention to provide a driver for a plane fluorescent panel which drives the panel efficiently to provide stabilized light emission and renders it difficult for noise from the panel to appear on the display picture of the liquid crystal television receiver even if the panel is used for the backlight of the receiver, and a liquid crystal television receiver using such panel.

In order to achieve the above object, according to the present invention, there is provided a liquid crystal television receiver comprising:

a liquid crystal display panel for displaying an image thereon;

a plane fluorescent panel provided as a backlight source on the side of the back of the liquid crystal display panel;

drive means for driving said plane fluorescent panel intermittently with a pulse signal; and pulse position adjusting means for providing control such that a first edge of each pulse of the pulse signal fed to the drive means and which is a rise or fall edge of that pulse is within a front porch of a horizontal blanking period of a video signal and that a second edge of that pulse which is a fall or rise edge of that pulse is within the horizontal synchronous pulse in the horizontal blanking period.

Thus, when the plane fluorescent panel is used as the backlight of the liquid crystal television receiver, the present invention provides a driver for the fluorescent panel which renders it difficult for noise from the panel to appear on the display picture of the receiver.

BRIEF DESCRIPTION OF THE DRAWINGS

FIG. 8 shows the specified structure of a pulse position adjuster and a pulse width adjuster of the television receiver of FIG. 7.

FIGS. 9(1)–9(4) show signal waveforms in the respective appropriate elements of the adjusters of FIG. 8.

FIGS. 10(1)–10(6) show respective signal waveforms in the appropriate elements of the television receiver of FIG. 7.

DESCRIPTION OF THE PREFERRED EMBODIMENTS

Figure 1:
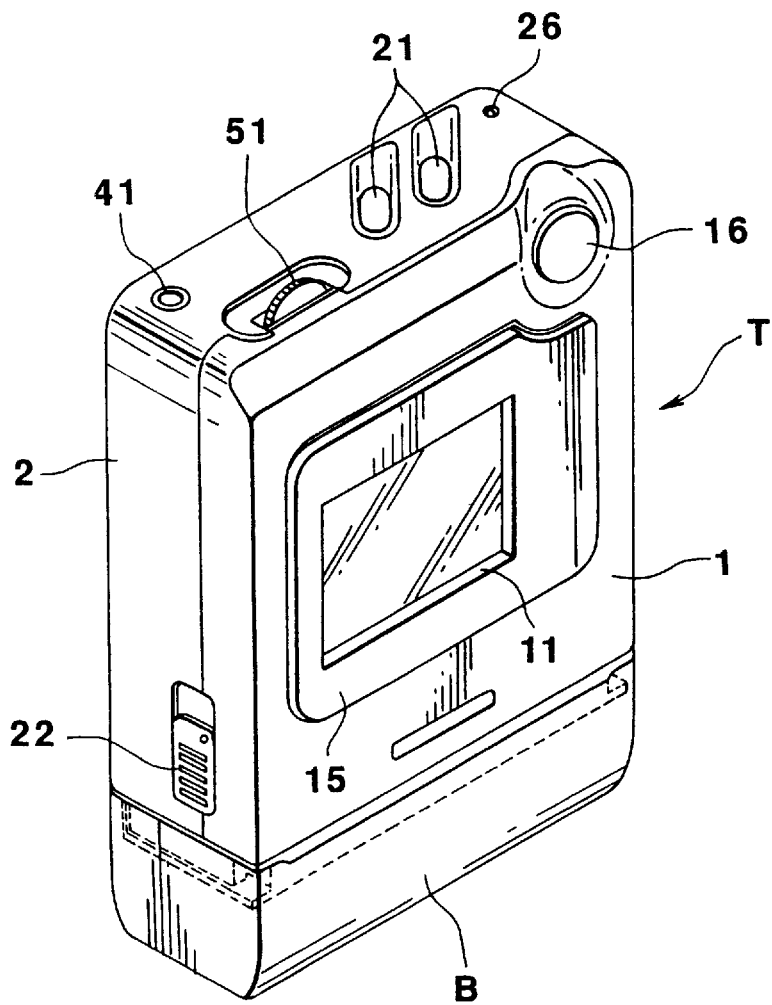
FIG. 1 is a schematic perspective view of an illustrative small liquid crystal television receiver with a plane fluorescent panel to which the present invention is applied.

An illustrative liquid crystal television receiver with a plane fluorescent panel according to the present invention will be described below with reference to FIGS. 1–6. FIGS. 1–4 show the appearance of the receiver, and its components. In these Figures, reference character T denotes the receiver body; reference numeral 1 denotes a front casing; 2, a back casing; 3, a bottom cover; 4, 5, a baseplate; 6, a liquid crystal display unit; 7, a shielding casing which also functions as a support; 8, a plane fluorescent panel unit; 9, a shielding casing which also functions as a support; and B, a battery casing.

Three kinds of power supplies; that is, a dry cell placed within the casing B, a chargeable battery pack and a power source with an AC adapter are usable for the receiver body T.

The front casing 1 is provided with a display window 11 at a left-hand position thereon with a light-transparent cover 15 adhered on four sides to a window frame 12 with double-sided adhesive tapes 101. A channel call button 16 is provided at an upper right-hand position on the display frame 12.

The back casing 2 is engaged with the front casing 1 at an upper position thereof and positioned and combined at lower positions with flat countersunk head screws 102. A pair of tuning buttons 21, and an earphone/antenna terminal 41 which is attached to the baseplate 4 are provided on an upper surface of the casing 2.

A voice volume dial 51 is provided on the upper surface in the junction between the front and back casings 1 and 2 while a power switch 22 which selects one of UHF and VHF is provided on the left-hand side as shown. The voice volume dial 51 is provided on the baseplate 5.

A picture changeover switch 23 is provided on an upper right-hand side of the back casing 2 for switching the picture to turn off the image and turn on only the voice. A battery case (or pack) removal switch 24 is provided at a lower position on the back casing. Reference numeral 25 denotes a return spring for the battery case removal switch 24.

A lamp display 26 which is lighted in conjunction with the operation of the image changeover switch 23 is provided on the upper surface of the back casing 2 with its lamp 26 being attached to the back of the baseplate 5. Reference numeral 27 denotes a lamp light introducing cap which is attached with a double-sided adhesive tape 103 to the baseplate of the tuning button 21.

The bottom plate 3 is engaged in a lower opening in the combined front and back casings 1 and 2 and positioned with screws 104. Power supply input terminals 31 extend through the bottom cover 3 with its support plate 32 being attached by screws 105 to the cover 3. Reference numeral 33 denotes cords.

Figure 3:
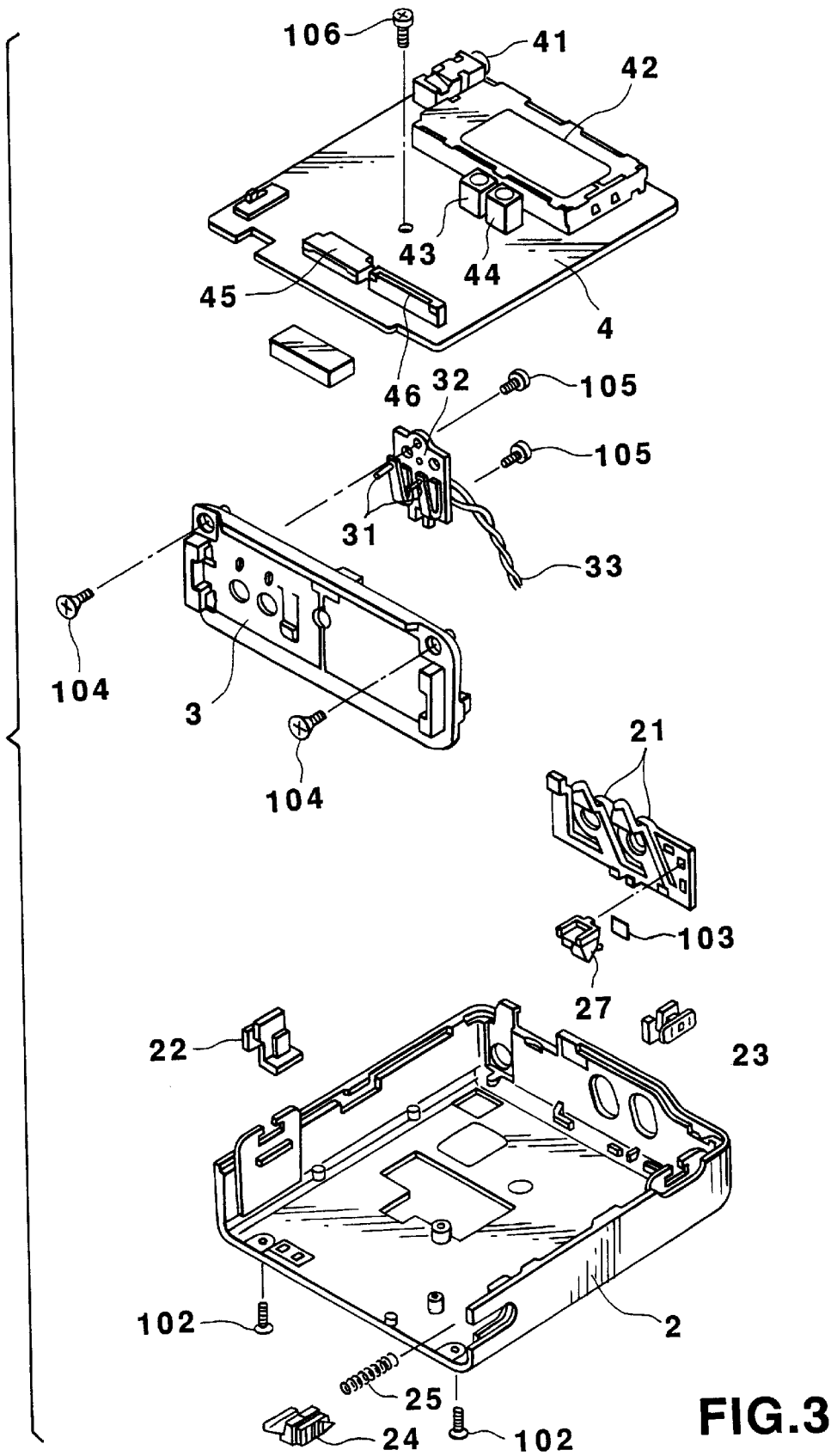
FIG. 3 is a similar exploded perspective view of the television receiver of FIG. 1, showing its back casing, bottom cover and baseplate.

The baseplate 4 of FIG. 3 is fixed by a screw 106 within the back casing 2. Provided on the front surface of the baseplate 4 are the earphone/antenna terminal 41, a tuner 42, capacitors 43, 44 and connectors 45, 46 with a television linear circuit LSI and a controller LSI provided on both surfaces of the baseplate 4.

Figure 2:
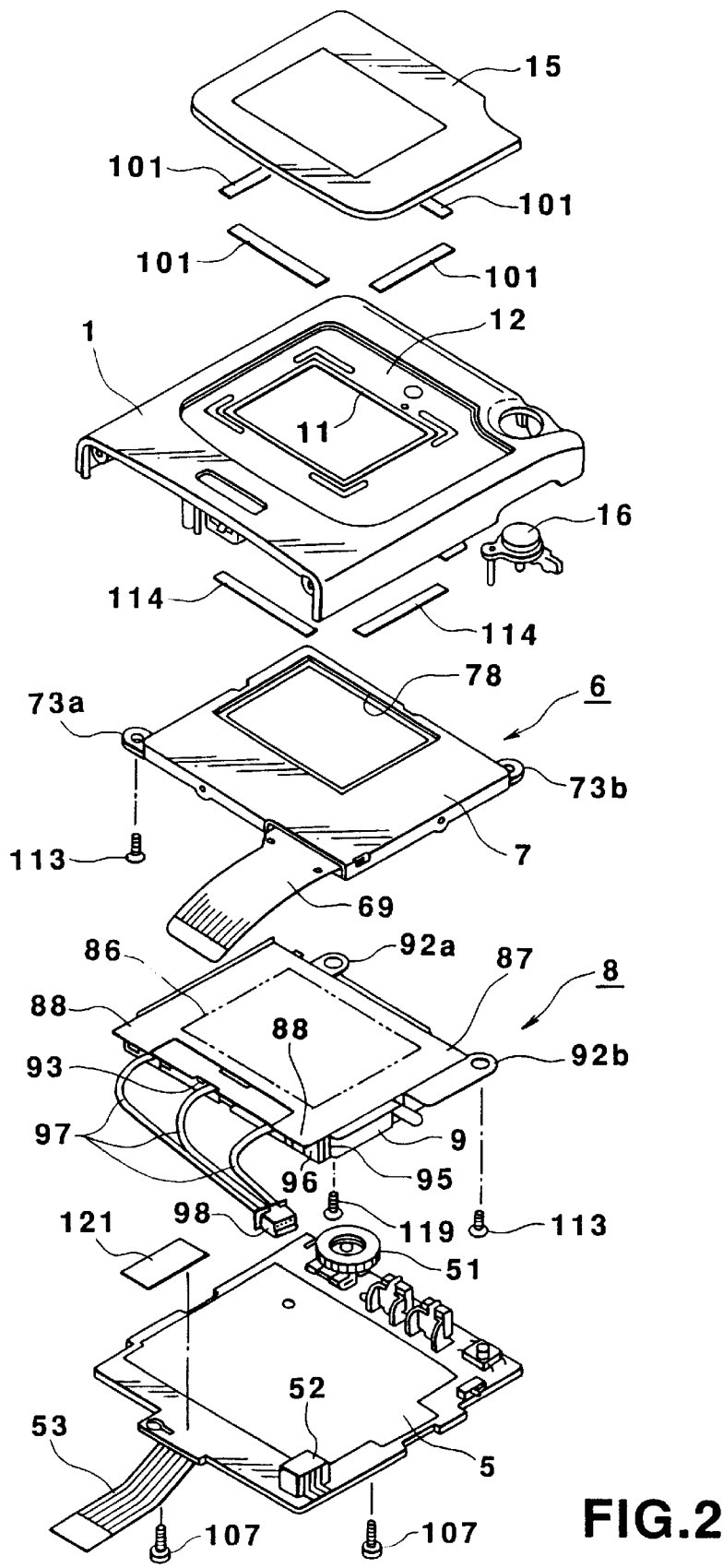
FIG. 2 is an exploded perspective view of the television receiver of FIG. 1, showing its front casing, liquid crystal display unit, plane fluorescent panel unit and baseplate.

The baseplate 5 of FIG. 2 is fixed by screws 107 within the front casing 1. The baseplate 5 has the voice volume dial 51, a connector 52, etc., attached to the front surface thereof and a driver for the plane fluorescent panel to be described in more detail later and a downward extending flexible substrate 53 attached to the back surface of the baseplate. The flexible substrate 53 is connected to the connector 45 of FIG. 3.

The liquid crystal display unit 6 and the plane fluorescent panel unit 8 are provided between the baseplate 5 and the front casing 1.

Figure 4:
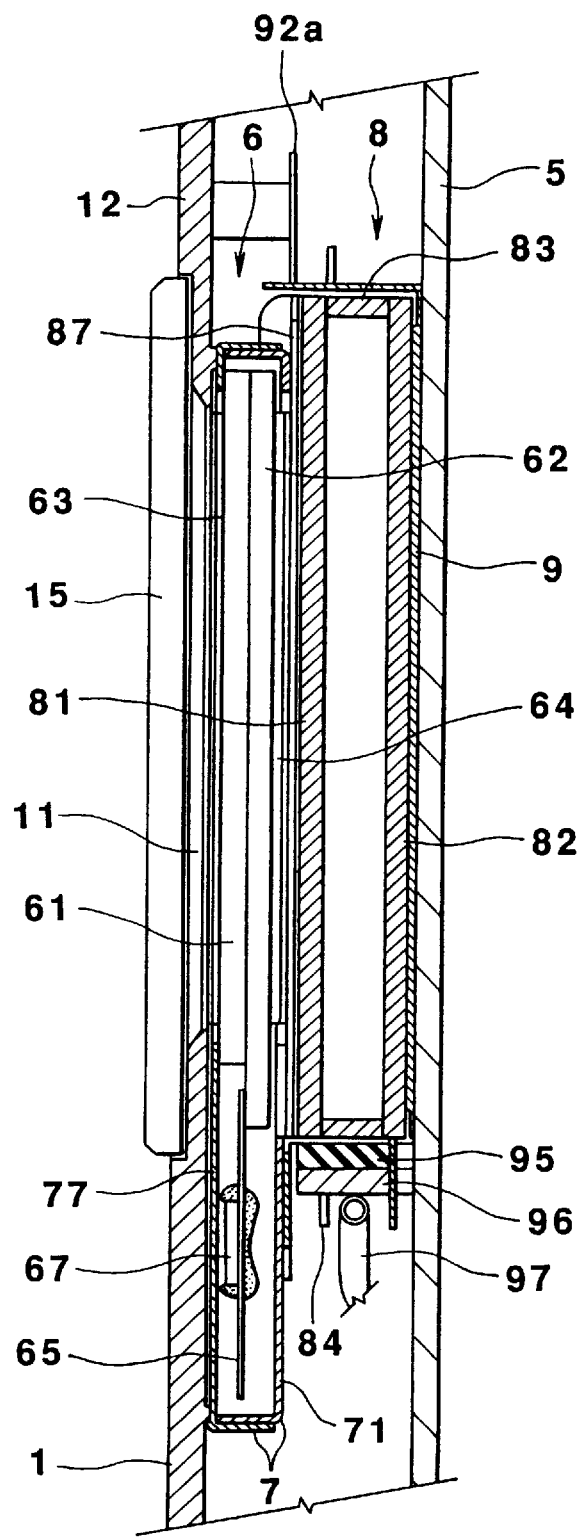
FIG. 4 is a longitudinal central cross-sectional view of an assembly of the front casing, liquid crystal display unit, plane florescent panel unit, and baseplate.

The liquid crystal display unit 6 has liquid crystal, transparent electrodes, an RGB color filter, and a black matrix (any of which is not shown) placed between a front glass baseplate 61 and a back glass baseplate 62 of FIG. 4. The front and back glass baseplates 61 and 62 are covered with polarization films 63 and 64, respectively.

Figure 5:
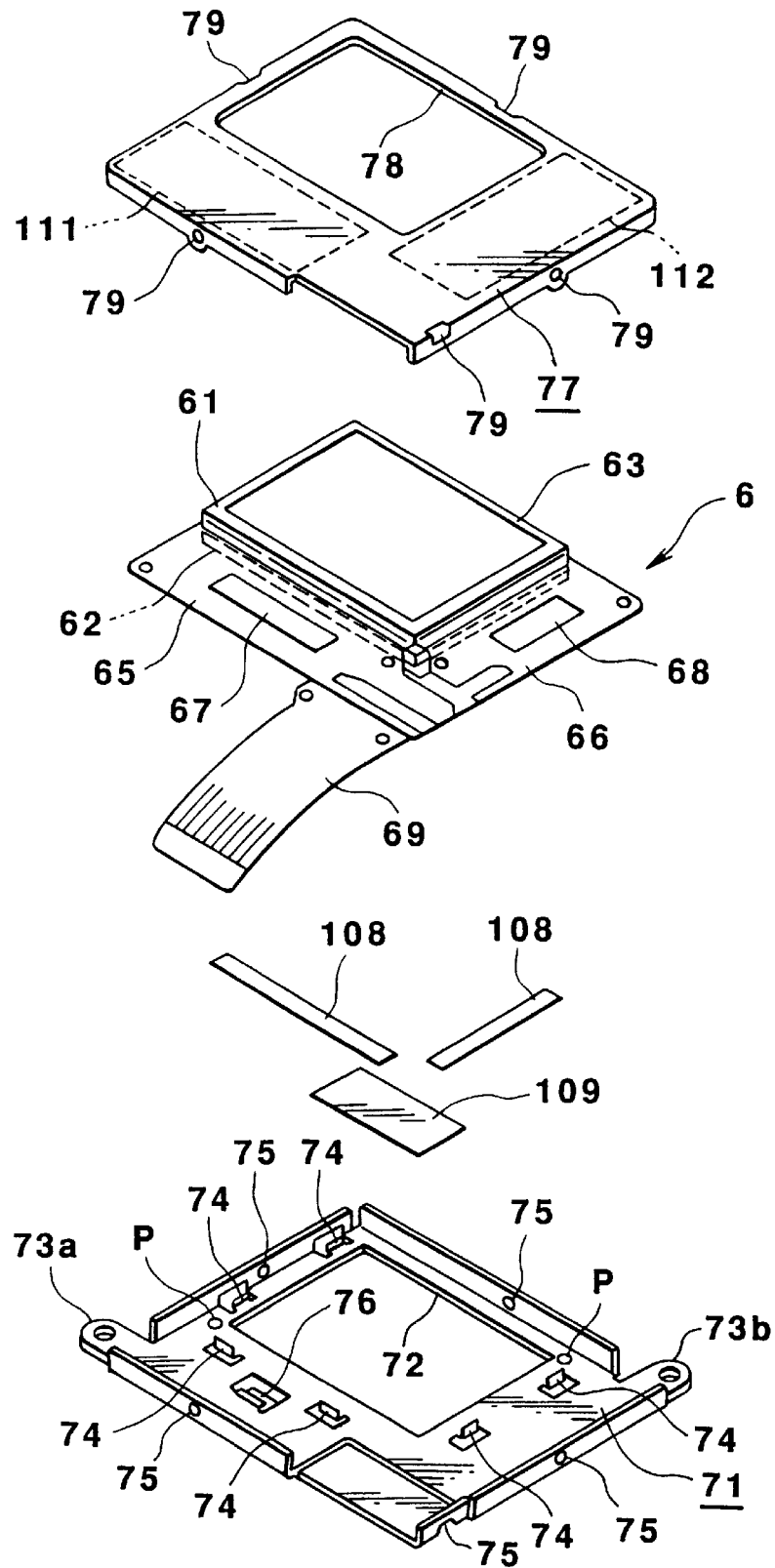
FIG. 5 is an exploded perspective view of the liquid crystal display unit.

The liquid crystal display unit 6 is provided with a flexible baseplate which constitutes part of a liquid picture driver and is integral therewith. More specifically, as shown in FIG. 5, a scanning electrode driver 67 and a signal electrode driver 68 are constituted by TAB (Tape Automated Bonding). It is provided with a lower flexible baseplate 65 and a right-hand side flexible baseplate 66 extending from the front and back glass plates 61 and 62, respectively, with the scanning electrode driver 67 and signal electrode driver 68 being provided on the lower and right-hand baseplates 65 and 66, respectively. A flexible baseplate 69 which connects both the baseplates 65 and 66 extends downward and connects to the connector 46 of FIG. 3.

As shown in FIG. 5, the shielding casing 7 which supports the liquid crystal display unit 6 is composed of back and front shielding casings halves 71 and 77.

The back shielding casing 71 has a backlight window 72 at an upper left-hand position thereon and fixing lugs 73a and 73b at lower left-hand and upper right-hand positions. A pair of glass baseplate restricting pawls 74 is provided along each of right- and left-hand sides and a lower side of the backlight window 72. A small fitting raise 75 is provided at the center of each of the four erect peripheral sides of the back shielding casing 71. A pawl 76 which engages the shielding casing 9 of the fluorescent panel unit 8 is provided between the pawls 74 provided along the lower side of the backlight window 72.

Assembling the liquid crystal display unit 6 with the back shielding casing 71 is effected by adhesion of the back glass plate 62 through double-sided adhesive tapes 108 to the backlight window 72 on the lower and right-hand sides of the backlight window 72 and adhesion of the connection of the flexible baseplates 65, 66 and the flexible baseplate 69 through double-sided adhesive tapes 109 to the lower right-hand portion of the casing 71.

More specifically, in order to effect the above assembling with high accuracy, two small positioning holes or points P are provided on a diagonal line of the backlight window 72 in the back shielding casing 71, and the corresponding positioning marks (not shown) are provided on the diagonal line on the back glass plate 62.

Thereafter, the assembling is effected in a state where the positioning marks on the back glass plate 62 are caused by a microscope to coincide with the positioning points P on the back shielding case 71.

The front shielding casing 77 has a picture window 78 at an upper left-hand position thereon with the erect peripheral sides of the front shielding casing 77 each having a small engagement hole 79 therein. Insulating tapes 111 and 112 are adhered to the lower and right-hand sides of the picture window 78 on the back of the front shielding casing 77.

The shielding casing 7 is constructed, as shown in FIG. 2, by fitting the front shielding casing 77 to the back shielding case 71 with the liquid crystal display unit 6 such that the small raises 75 fit into the corresponding holes 79 on the four sides of the casing 77.

When the shielding casings 77 and 71 are in the fitted state, the front shielding casing 77 is insulated by the insulating tapes 111 and 112 on the back of the front shielding casing 77 from the scanning electrode driver 67 and the signal electrode driver 68.

As described above, in FIG. 2, the shielding casing 7 which supports the liquid crystal display unit 6 in wrapping relationship to same is positioned and attached by screws 113 in the lower left-hand and upper right-hand lugs 73a, 73b to bosses (not shown.) raised from the back of the display window frame 12 of the front casing 1.

In this attachment, the shielding casing 7 is adhered at its front by adhesive double-sided tapes 114 to the back of the display window frame 12. The screws 113 tighten the upper right-hand attaching lug 73b and the shielding casing 9 of the plane fluorescent panel 8.

The plane fluorescent panel unit 8 will next be described. It contains an argon gas and mercury in a container which is composed of a front glass panel 81, a back glass panel 82 and a glass frame 83, as shown in FIG. 4, and a pair of opposing right- and left-hand discharge electrodes having a hollow cathode structure of a U- or V- cross section (not shown) disposed, respectively, within the container with the respective inner surfaces of the front and back glass panels 81 and 82 being coated with a fluorescent material by screen process printing.

Figure 6:
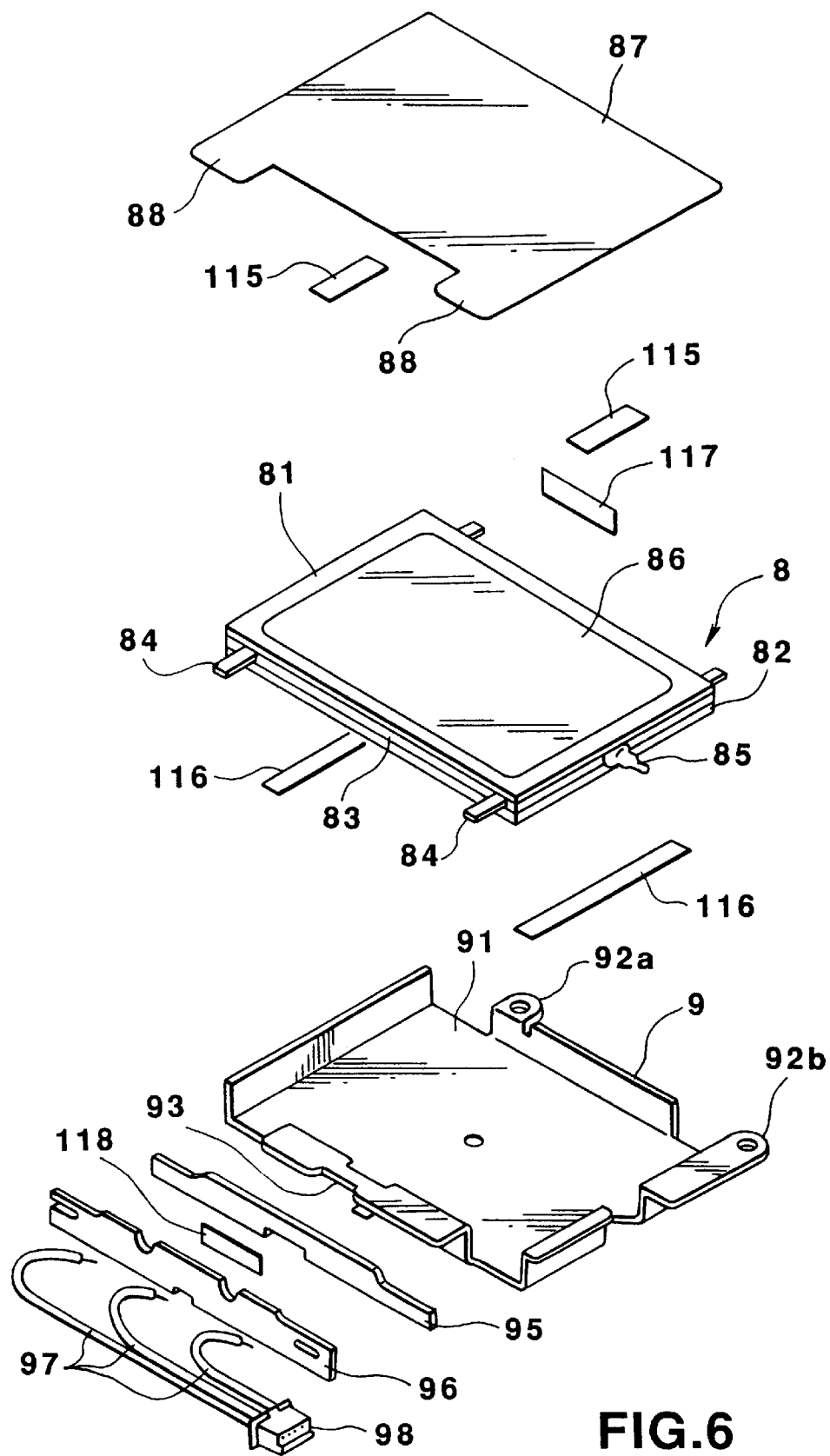
FIG. 6 is an exploded perspective view of the plane florescent panel unit.

As shown in FIG. 6, the plane fluorescent panel unit 8 is provided with downward extending leads 84 corresponding to the right- and left-hand discharge electrodes. Reference numerals 85 and 86 denote a gas discharge panel and the fluorescent surface, respectively.

The plane fluorescent panel unit 8 is driven by the driver provided on the back of the baseplate 5 and described in more detail later such that the plane fluorescent panel unit 8 emits uniform light from the overall fluorescent surface 86.

A thin transparent resin sheet 87 is adhered by right- and left-hand double-sided adhesive tapes 115 to the front glass panel 81 with a slight spacing between the fluorescent surface 86 and the resin sheet 87. The resin sheet 87 has high thermal resistance and the function of intercepting ultraviolet rays and is made, for example, of a composition of polyethylene terephtharate (PET) and an ultraviolet ray intercepting material. The ultraviolet ray intercepting material may be coated on the polyethylene terephtharate.

The resin sheet 87 is provided with right- and left-hand extensions 88 corresponding to the leads 84.

The shielding casing 9 which supports the plane fluorescent panel unit 8 isolates an adverse influence of electromagnetic waves generated by the plane fluorescent panel on the peripheral circuits and is provided with a pair of right- and left-hand attaching lugs 92a and 92b on upper sides of the back support plate 91, as shown in FIG. 6. The shielding casing 9 is provided on its lower edge with an engagement cavity 93 which is engaged with the shielding casing 7 of the liquid crystal display unit 6.

The plane florescent panel unit 8 is assembled with the shielding casing 9 such that the back glass panel 82 of the plane fluorescent panel unit 8 is adhered by right- and left-hand double-sided adhesive tapes 116 to the back support plate 91 of the shielding casing 9. An insulating tape 117 is adhered to the upper left-hand side of the plane fluorescent panel unit 8 for electrically isolating nearby elements from the plane fluorescent panel unit 8.

A baseplate 96 is applied through a spacer 95 to a lower portion of the shielding casing 9. The right- and left-hand leads 84 and three lead conductors 97 are soldered to the baseplate 96. The lead conductors 97 are connected to a connector 98, which is, in turn, connected to the connector 52 of FIG. 2.

As described above, the spacer 95 is held between the shielding casing 9 and the baseplate 96 to function as a receiver for the baseplate 96 when the baseplate 96 is attached through a double-sided adhesive tape 118, also function as means for preventing leakage of light emitted by the plane fluorescent panel unit 8, and ensures an isolation distance from high voltage between the shielding casing 9 and the baseplate 96.

As described above, the shielding casing 9 which supports the plane fluorescent panel unit 8 in wrapping relationship to the plane fluorescent unit 8 has its lower concavity 93 engaged with the engagement pawl 76 at the lower portion of the shielding casing 7 of the liquid crystal display unit 6.

As shown in FIG. 2, the shielding casing 9 is attached at its upper left-hand attaching lug 92a to the raised boss on the back of the display window frame 12 of the casing 1, and is tightened along with the attaching piece 73b of the shielding casing 7 of the liquid crystal display unit 6 by the screw 113 at the upper right-hand attaching lug 92b to be attached to the boss on the back of the display window frame 12.

As just described above, both the shielding casings 7, 9 are used as a ground GND. In FIG. 2, reference numeral 121 denotes an insulating tape adhered to the baseplate 5.

Thus, as shown in FIG. 4, the plane fluorescent panel unit 8 is disposed very close to the back of the liquid crystal display unit 6 by contacting the shielding casing 9 of the plane fluorescent panel unit 8 on the back of the shielding casing 7 of the liquid crystal display unit 6.

Since high voltage is required for emitting light from the plane fluorescent panel, the leads 84 of the plane fluorescent panel unit 8 and the baseplate 96 to which the leads 84 are connected are placed in a high voltage region. When the shielding casing 7 of the liquid crystal display unit 6 is close to the leads 84 of the plane fluorescent panel unit 8 and the baseplate 96, electric discharge would occur due to high voltage difference concerned, such that a current flows and that the inside of the liquid crystal display unit 6 is broken.

A resin sheet 87 having extensions 88 before the leads 84 is provided on the front surface of the plane fluorescent panel unit 8 to prevent touch of the user's hand on the leads 84 and atmospheric discharge or leakage between the leads 84, the baseplate 96 and the shielding case 7 of the liquid crystal display unit 6.

The ultraviolet ray intercepting material contained in the resin sheet 87 serves to protect the liquid crystal from the ultraviolet rays which would otherwise deteriorate the liquid crystal.

The resin sheet 87 having high thermal resistance is adhered to the fluorescent surface 86 with the slight spacing between the sheet 87 and the fluorescent surface 86 such that the air layer within that spacing is warmed by heat produced from the plane fluorescent panel to provide uniform distribution of temperature for the fluorescent surface 86 to thereby increase the stability of the light emission from a standpoint of the electrical property of the plane fluorescent panel.

The provision of the resin sheet 87 on the fluorescent surface 86 prevents possible creation of cracks on the fluorescent surface 86 in the assembling process in factories, which would otherwise produce diffuse reflection, and reflect the scratches as shadows on the screen.

In addition, the liquid crystal display unit 6 is positioned relative to the front casing 1 with high precision. In this case, as mentioned above, the positioning points P of the back shielding casing 71 are caused to coincide correctly with the positioning marks on the back glass plate 62 by the microscope.

The attaching lugs 73a, 73b of the shielding casing 7 are positioned and attached by the screws 113 at and to the bosses on the back of the display window frame 12 of the front casing 1.

In the above manner, a thin, compact, light, small liquid crystal television receiver body T with a liquid crystal display device positioned with high accuracy is constructed.

According to this receiver body T, the plane fluorescent panel unit 8 provides plane light emission and hence uniform illumination to the liquid crystal display unit 6. That is, it provides a satisfactory display screen without uneven luminance and temperature.

While the present invention has been illustrated as being directed to the small liquid crystal television receiver in the above embodiment, the present invention is not limited to it. The present invention is applicable to larger liquid crystal television receivers. The appearance of the liquid crystal television receivers can be designed arbitrarily. Other specific detailed structures of the television receivers are changeable as required, of course.

One embodiment of the circuit configuration of the liquid crystal television receiver using the plane fluorescent panel and the driver for the plane fluorescent panel in the above arrangement will be described below with respect to FIGS. 7–10.

Figure 7:
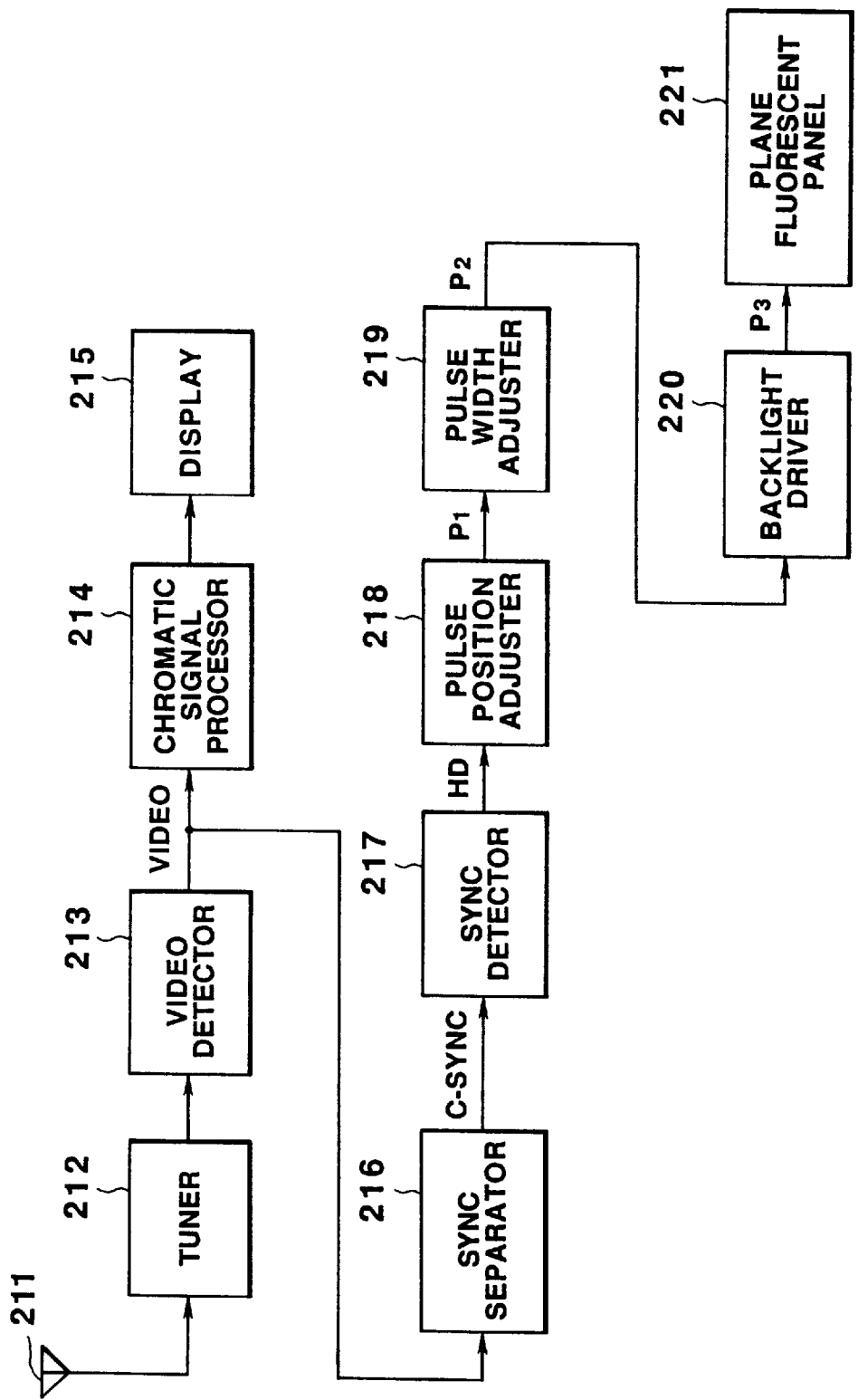
FIG. 7 is a block diagram of the circuit configuration of the television receiver.

FIG. 7 is a block diagram of the liquid crystal television receiver using the plane fluorescent panel as the backlight source. In FIG. 7, a radio frequency signal received by an antenna 211 is converted by a tuner 212 to an intermediate frequency signal, and a desired station frequency is selected which is fed to a video detector 213, which detects a video signal from the intermediate frequency signal and feeds the video signal to a chromatic signal processor 214 and a sync separator 216. The chromatic signal processor 214 reproduces R, G and B chromatic signals from the video signal, and feeds those signals to a display 215 composed of a liquid crystal display panel for displaying purposes.

The sync separator 216 extracts and separates a sync signal C-SYNC from the video signal and feeds the obtained sync signal to the sync detector 217, which exposes the sync signal C-SYNC to a PLL (phase-locked loop) process to thereby provide a horizontal sync signal (HD) and a vertical sync (VD) signal. The sync detector 217 feeds the horizontal sync signal HD to a pulse position adjuster 218. The The pulse position adjuster 218 which is composed, for example, of a monostable multivibrator, delays the horizontal syn signal HD from the sync detector 217 with appropriate timing to adjust the position of a pulse in the signal and feeds the resulting pulse signal P1 to a pulse width adjuster 219. This pulse width adjuster 219 feeds a switching pulse P2 with an appropriately adjusted width to a backlight (BL) driver 220 in order to cause the plane fluorescent panel 221 to emit light with a predetermined luminance on the basis of the pulse signal P3, for example, at its fall edge.

FIG. 8 shows the pulse position adjuster 218 and pulse width adjuster 219 each composed of a monostable multivibrator. In FIG. 8, the pulse position adjuster 218 is composed of two monostable multivibrators MM1 and MM2 while the pulse width adjuster 219 is composed of a single monostable multivibrator MM3.

Let the time constants of the monostable multivibrators MM1 and MM2 be ta and tb which are determined by a set of a capacitor C201 and a variable resistor VR201 and a set of a capacitor C202 and a resistor R202, respectively, and let the time constant of the monostable multivibrator MM3 be tON which is determined by a set of a capacitor C203 and a variable resistor VR203. First, the monostable multivibrator MM1 is triggered with a fall edge of the horizontal sync signal HD (FIG. 9(1)) from the sync detector 217 to produce a pulse signal which is high for only an interval of time ta, as shown in FIG. 9(2), and outputs the pulse signal to the monostable multivibrator MM2. The monostable multivibrator MM2 is triggered with a fall edge of the pulse signal to produce a pulse signal P1 which is high for only an interval of time tb, show,n in FIG. 9(3), and outputs the signal P1 to the monostable multivibrator MM3 of the pulse width adjustor 219. The monostable multivibrator MM3 is triggered with a fall edge of the pulse signal P1 to produce a pulse signal P2 which high for only the interval of time tON shown in FIG. 9(4).

The overall operation of the embodiment will be described below with respect to FIG. 10.

FIG. 10(1) denotes a video signal obtained from the video detector 213 where the interval of time a from t0 to t1 is for a front porch of a horizontal blanking period, the interval of time b from t1 to t2 is for a horizontal sync pulse of the horizontal blanking period, the interval of time c from t2 to t3 is for a back porch of the horizontal blanking period, and the interval of time d from t3 to t4 which coincides with the next time t0 is for an actual video signal.

The sync separator 216 extracts and separates a sync signal C-SYNC shown in FIG. 10(2) and outputs it to the sync detector 217, which produces a horizontal sync signal HD which rises synchronously with the ending time t2 of the horizontal sync pulse HD in accordance with the received sync signal C-SYNC, as shown in FIG. 10(3), and feeds the signal HD to the pulse position adjuster 218.

The pulse position adjuster 218 delays the horizontal signal HD as required to produce a pulse signal P1 shown in FIG. 10(4) such that as the first conditions the fall of the signal P1 at the time t5 is within the front porch portion a of the next horizontal blanking period. The pulse width adjuster 219 produces a switching pulse P2 which rises synchronously with the fall of the pulse signal P1 within the front porch portion a at a time t5.

The second condition of the pulse signal P1 is to ensure that the time t6 when the switching pulse P2 falls after a lapse of the interval of time tON from the time t5 is within the horizontal sync pulse interval b. The interval of time tON is beforehand set variably by the pulse width adjuster 219 depending on the luminance and lighting safety of the plane fluorescent plane 221 and the transmittance of the liquid crystal panel of the display 215. Even when the time width tON is set at its minimum or maximum, the pulse position adjuster 218 adjusts the position of the pulse signal P1 such that the time t6 when the switching pulse P2 falls is ensured to be within the duration of the horizontal sync pulse interval b.

The above is shown synthetically as follows, using the respective times t0–t6:

$$t0 \leq t5 < t1 \quad (1)$$

$$t1 < t6 < t2 \quad (2).$$

Therefore, the pulse position adjuster 218 adjusts the position of the pulse signal P1 so as to satisfy the two conditions (1) and (2) together.

The FET of the backlight driver 220 is turned on/off in accordance with the switching pulse P2 the position of which is adjusted, and a voltage signal P3 having a waveform shown in FIG. 10(6) is applied across both the electrodes of the plane fluorescent panel 221. Even though noise occurs at an edge e of the signal P3 at a time t5, the time t5 is within the front porch of the horizontal blanking period of the video signal. Thus, the noise influences on neither the display nor the separation of the horizontal sync pulse.

Even if noise occurs at an edge f of the signal P3 at a time t6, the edge f is set so as not to coincide with the leading or trailing edge of the horizontal sync pulse, as mentioned above. Thus, similarly, the noise influences neither the display nor a distribution in the phase of the separated horizontal sync pulse.

It is to be noted that the adjustment of the position of the pulse may be made, for example, by a counter which counts clock signals, and not by a monostable multivibrator such as that in the present embodiment.

As described above, according to the present embodiment, the pulse position adjuster is provided which provides timing control such that the first edge of the pulse signal for intermittent drive of the plane florescent panel used for the backlight source and which is a rise or fall edge of the pulse signal is within the front porch of the horizontal blanking period of the video signal and the second edge of the pulse signal which is a fall or rise edge of the pulse signal is adjusted so as to be within the horizontal sync pulse of the horizontal blanking period to thereby time the pulse signal which drives the plane fluorescent panel at a position where no noise influences the video signal. Therefore, according to the present embodiment, there is provided a device which uses a plane fluorescent panel of a liquid crystal television receiver and very suitable for portability and with simple additional circuits such as the pulse position and width adjusters which eliminates the need for insulating members such as shielding members, and prevents an adverse effect of possible noise on the video signal, and a method of driving a plane fluorescent panel.

A second embodiment of the driver for the plane fluorescent panel according to the present invention will be described below with respect to FIGS. 11–14.

Figure 11:
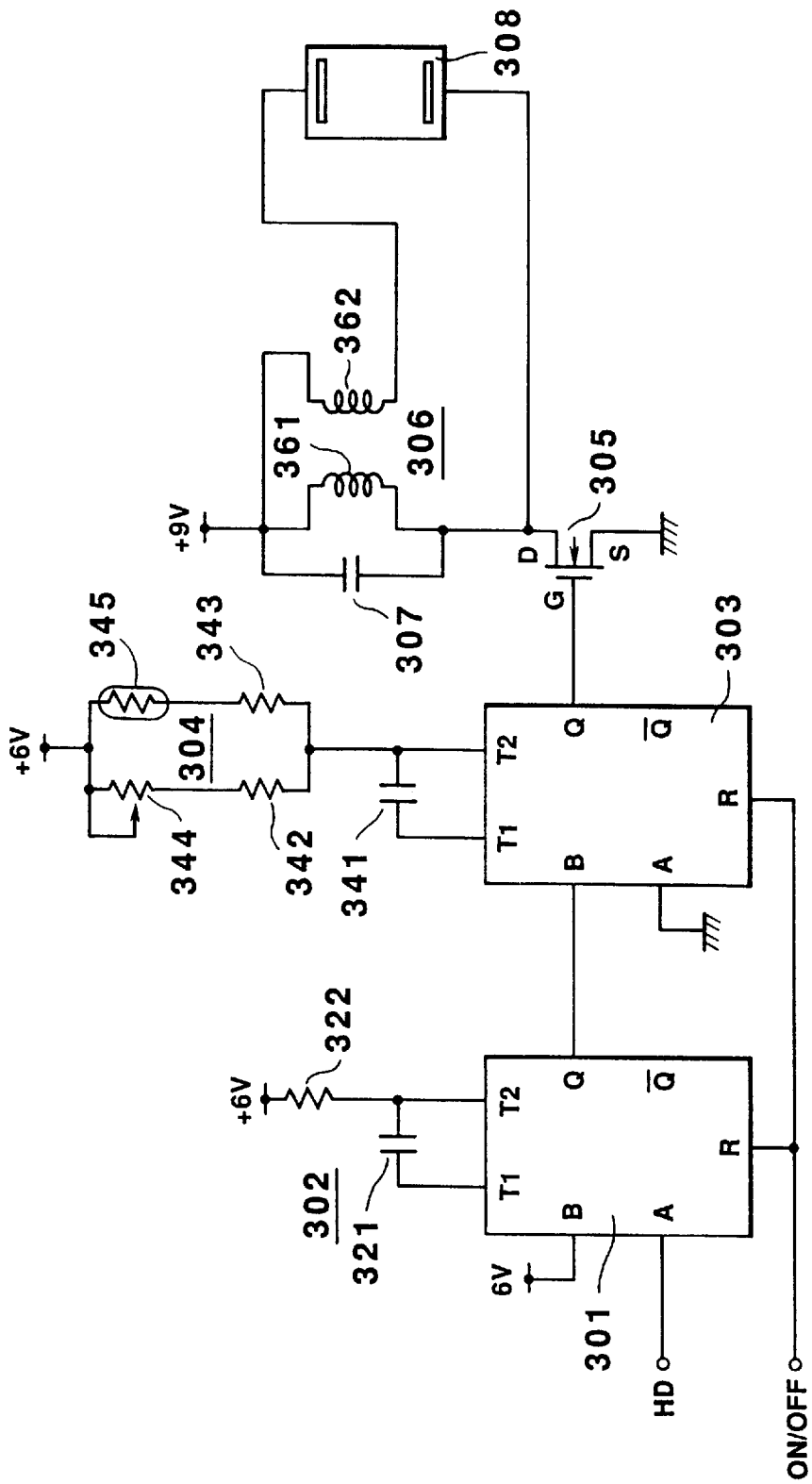
FIG. 11 shows a schematic structure of a second embodiment of the driver for the plane fluorescent panel according to the present invention.

FIG. 11 shows the second embodiment of the driver for the plane fluorescent panel used as the backlight for the liquid crystal display of a liquid crystal television receiver. In FIG. 11, reference numeral 301 denotes a C-MOSIC 301 for a first monostable multivibrator which generates a syncpulse. The first monostable multivibrator C-MOSIC 301 receives a switching pulse ON/OFF at a terminal R, a horizontal sync signal HD from the television receiver (not shown) at a terminal A and a +6 volt voltage at a terminal B, and has a time constant circuit 302 of a capacitor 321 and a resistor 322 connected across terminals T1 and T2. The first monostable multivibrator C-MOSIC 301 changes the position of the switching pulse ON/OFF received at the terminal R, using the time constant determined by the capacitor 321 and the resistor 322, such that the switching operation of the switching pulse ON/OFF occurs within the horizontal blanking period to generate from a terminal Q an output pulse having a predetermined width synchronous with the horizontal sync signal HD.

The output pulse from the first monostable multivibrator C-MOSIC 301 is fed to a terminal B of a C-MOSIC 303 for a second monostable multivibrator. The second monostable multivibrator C-MOSIC 303 receives a switching pulse ON/OFF at a terminal R with a terminal A being grounded and set the width of an output pulse from the first monostable multivibrator C-MOSIC 301 in accordance with the time constant of a time constant circuit 304 connected across terminals T1 and T2. The time constant circuit 304 is provided with a capacitor 341, resistors 342, 343, a variable resistor 344, and a thermistor 345 which changes its resistance value in accordance with a change in the ambient temperature to thereby change the time constant. That is, when the ambient temperature decreases, the time constant determined by the temperature characteristic of the thermistor 345 increases the width of the pulse output from the second monostable multivibrator C-MOSIC 303 while when the ambient temperature increases conversely, the time constant deceases the pulse width of the pulse output from the second monostable multivibrator C-MOSIC 303.

The output pulse with the changed or adjusted width from the second monostable multivibrator C-MOSIC 303 is fed to the gate G of the MOS transistor 305, which has a source S grounded and a drain D connected through a primary winding 361 of a transformer 306 to the +6 V power supply.

The transformer 306 has the primary winding 361 connected in parallel with a capacitor 307, and a secondary winding 362 connected in series with the plane fluorescent panel 308 with this series circuit being connected across the +6 V power supply and the drain of the MOS transistor 305.

The operation of the present embodiment, thus constructed, will be described below. When a switching pulse ON/OFF is fed to the terminal R of the first monostable multivibrator C-MOSIC 301 and a horizontal sync signal HD is fed from the television receiver body (not shown) to the terminal A, the switching operation with the switching pulse ON/OFF is set so as to occur within the horizontal blanking period on the basis of the time constant of the time constant circuit 302 and an output pulse synchronous with the horizontal sync signal HD is output from the terminal Q.

The output pulse from the first monostable multivibrator C-MOSIC 301 is fed to the second monostable multivibrator C-MOSIC 303, which sets the width of the output pulse with the time constant of the time constant circuit 304 connected across terminals T1 and T2. The output pulse having the set width is fed to the gate G of the MOS transistor 305.

Thus, the on/off time of the MOS transistor 305 is controlled in accordance with the width of the output pulse, and a pulse voltage is fed to the primary winding 361 of the transformer 306. Thus, a square drive voltage is generated across the secondary winding 362 and fed to the plane fluorescent panel 308 to thereby light the plane fluorescent panel 308.

When the ambient temperature lowers under such conditions, the resistance value of the thermistor 345, the time constant of the time constant circuit 304 and hence the width of the output pulse increase. Thus, the square waveform of the drive voltage is changed accordingly and hence the luminance of the plane fluorescent panel 308 is increased. Conversely, when the ambient temperature increases, the resistance value of the thermistor 345 decreases in accordance with its temperature characteristic, and the time constant of the time constant circuit 304 and the width of the output pulse decrease. Thus, the square waveform of the drive voltage fed to the plane fluorescent panel 308 is changed accordingly and the luminance of the plane fluorescent panel 308 is decreased.

Figure 12:
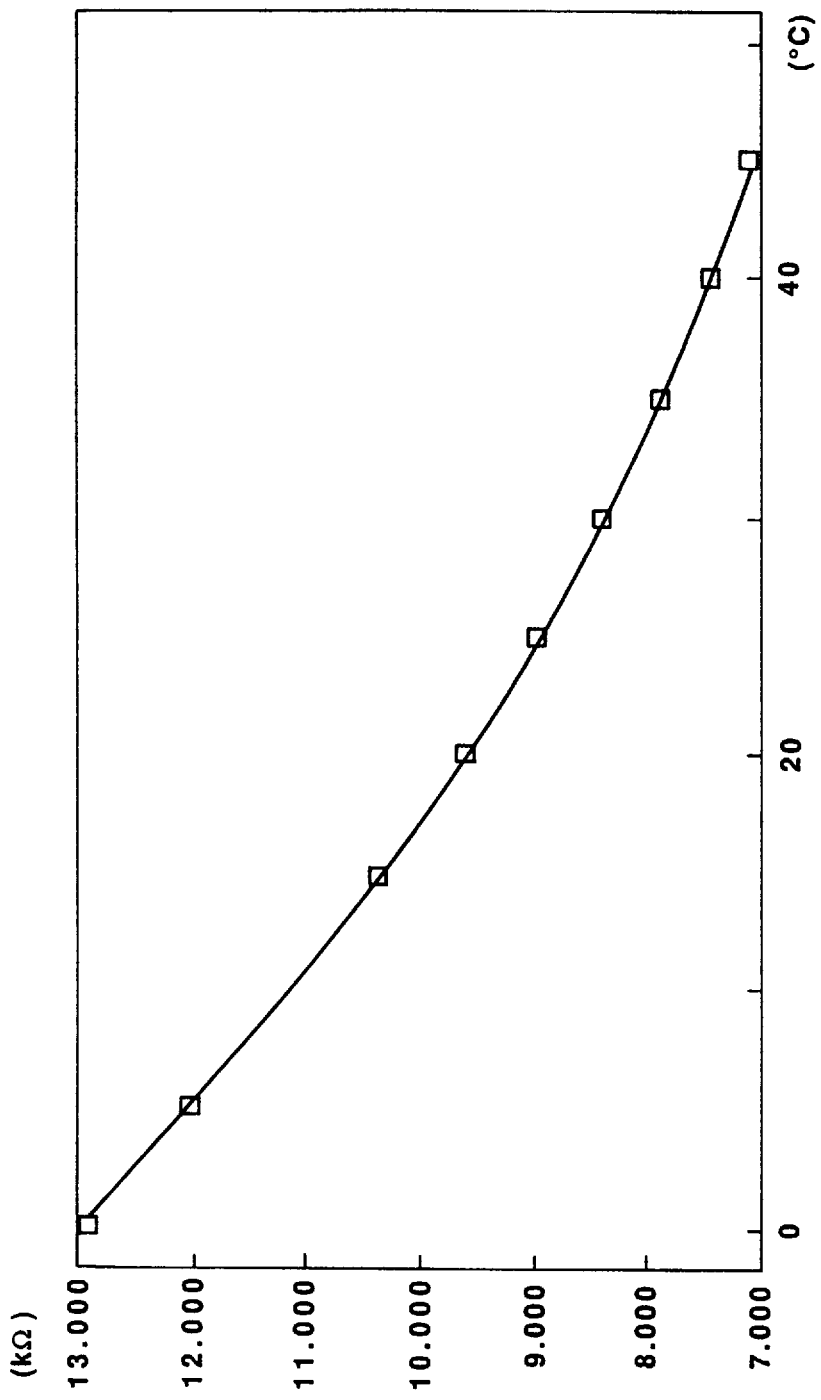
FIG. 12 shows the relationship between the total resistance value of a time constant circuit of the second embodiment and its ambient temperature.
Figure 13:
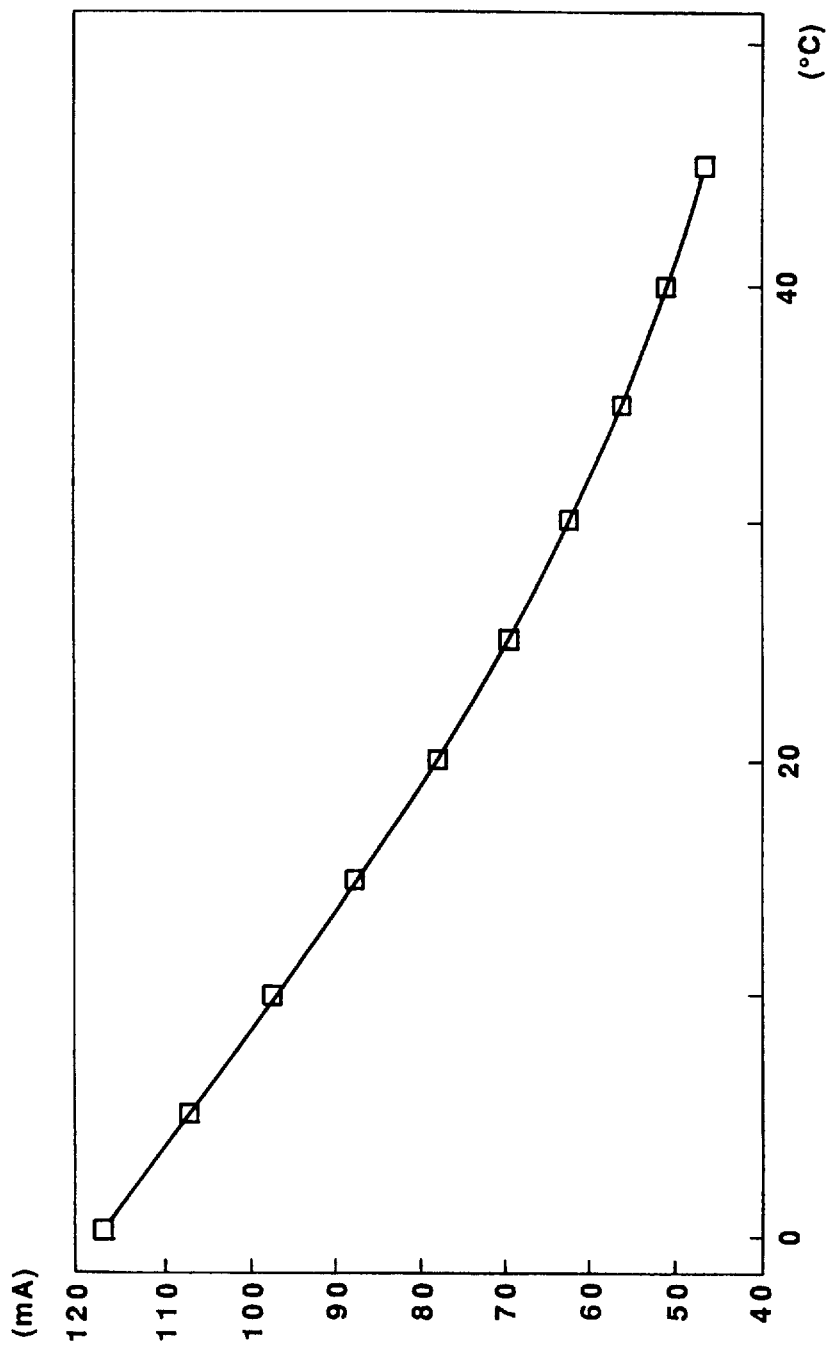
FIG. 13 shows the relationship between a lighting current in the plane fluorescent panel of the second embodiment and its ambient temperature.
Figure 14:
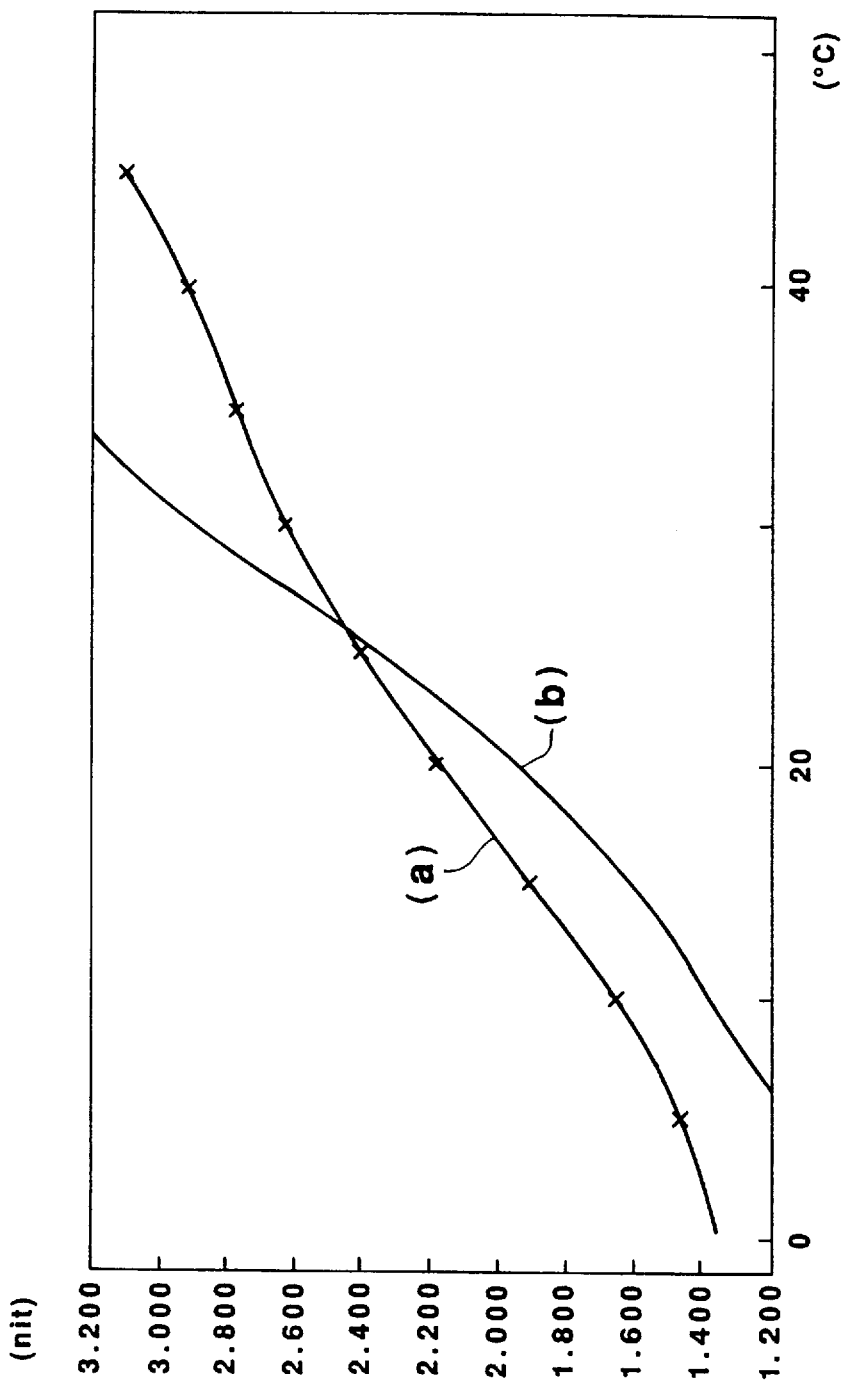
FIG. 14 shows the relationship between the luminance of the second embodiment and its ambient temperature.

When the resistors 342, 343 and 344 of the time constant circuit 304 have 15, 6.2 and 5 Kiloohms, respectively, the relationship between the ambient temperature and the total value of those resistors 342, 343, and 344 and the thermistor 345 is given in FIG. 12, where it has been confirmed that as the ambient temperature decreases, the total resistance value increases whereas as the ambient temperature increases, the total resistance value decreases. At this time, the relationship between the ambient temperature and the lighting current flowing through the plane fluorescent panel 308 is shown in FIG. 13, where it has been confirmed that as the ambient temperature decreases, the lighting current increases whereas as the ambient temperature increases, the lighting current decreases.

Thus, the width of the output pulse and hence the luminance of the plane fluorescent panel 308 are adjusted. The relationship between the luminance and the ambient temperature is shown in FIG. 14(a). According to the embodiment, a change in the luminance of the plane fluorescent panel 308 with a change in the ambient temperature is rendered gentler and minimized and, in a low temperature region, lighting the plane fluorescent panel 308 is ensured, compared to the conventional driver of FIG. 14(b).

Thus, adjustment of the width of the output pulse in accordance with a change in the ambient temperature using the temperature characteristic of the thermistor minimizes a change in the luminance of the panel with a change in the ambient temperature. In a low temperature region, lighting the plane fluorescent panel is ensured. No great change in the brightness of the television picture depending on the ambient temperature is prevented. A decrease in the luminance of the plane fluorescent panel in a relatively low temperature area is greatly suppressed and hence the television picture is prevented from becoming difficult to see. Even when the temperature lowers to about 5° C., the plane fluorescent panel can be lighted in a stabilized manner.

The present invention is not limited to the second embodiment, and may be changed without departing from its spirit as required. While in the above embodiment, for example, the output pulse to drive the plane fluorescent panel 308 is synchronized with the horizontal sync signal, it may be synchronized with the vertical sync signal. While in the above the driver of the plane fluorescent panel used as the backlight for the liquid crystal display of the liquid crystal television has been illustrated, the present invention is applicable to a driver for a plane fluorescent panel used as the backlight for a liquid crystal display, for example, of word processors.

A third embodiment of the driver of the plane fluorescent panel according to the present invention will be described below with respect to FIGS. 15–18.

Figure 15:
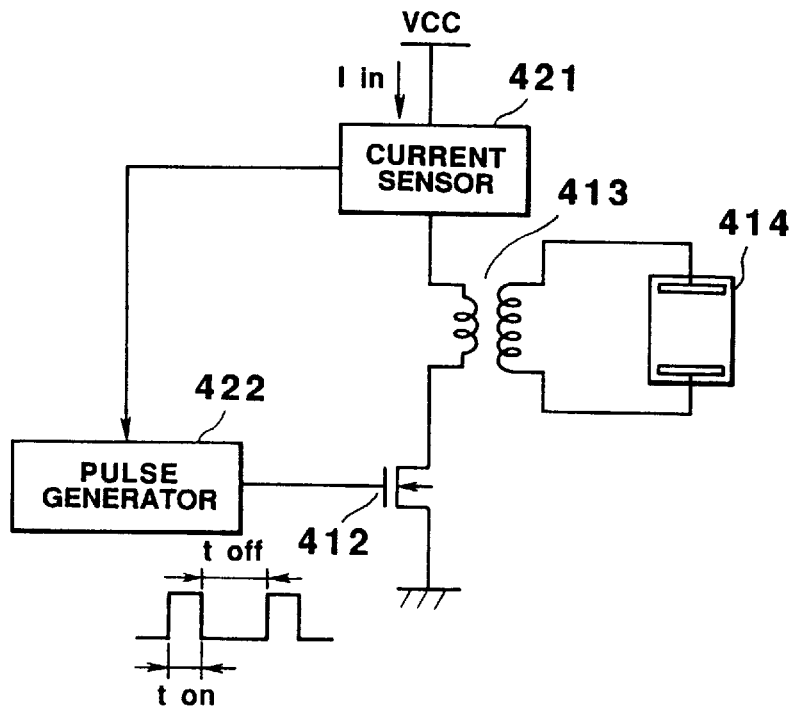
FIG. 15 shows a schematic structure of a third embodiment of the driver for the plane fluorescent panel according to the present invention.

FIG. 15 is a schematic view of the circuit configuration of the present embodiment. A switching pulse generated by a pulse generator 422 is input to the gate terminal of an n-channel FET 412 as a switching element. The source terminal of the FET 412 is grounded and its drain terminal is connected to one terminal of a primary winding of a step-up transformer 413 and the other terminal of its primary winding is supplied with a voltage Vcc through a current sensor 421 which senses a current flowing through the primary side of the transformer 413. Both the secondary side terminals of the transformer 413 are connected to the corresponding electrodes of the plane fluorescent panel 414.

The value of the current flowing through the primary side of the transformer 413 and sensed by the current sensor 421 is fed to the pulse generator 422, which generates a switching pulse having a width depending on the current value from the current sensor 421 and feeds the pulse to the n-channel FET 412.

This causes the FET 412 to turn on for only the duration of the pulse, during which the supply voltage Vcc is stepped up by the step-up transformer 413 and then applied to the plane fluorescent panel 414 for lighting and driving purposes.

Figure 16:
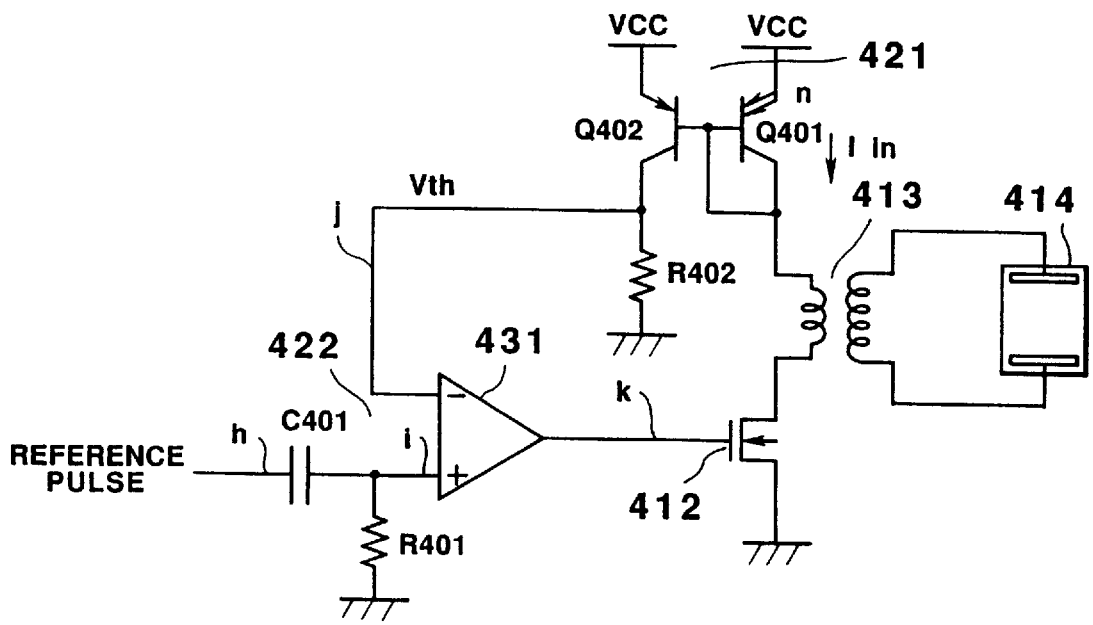
FIG. 16 is shows the specified circuit structure of the driver of FIG. 15.

FIG. 16 shows a specified circuit structure of the embodiment of FIG. 15. In FIG. 16, the current sensor 421 is composed of a mirror circuit which is provided with two PNP transistors Q401 and Q402 and a resistor R402. The transistors Q401 and Q402 each have an emitter supplied with a voltage Vcc with a ratio in area of the former emitter to the latter one being set at about n:1, where n is a natural number, for example, about 100:1. The transistor Q401 has a collector shortcircuited to its base and connected to the primary side of the transformer 413 with its collector current being a consumed current Iin. The transistor Q402 base is connected to the transistor Q401 base with the collector of the transistor Q402 being grounded through the resistor R402 and connected to the minus (−) input terminal of a comparator 431 of the pulse generator 422.

The pulse generator 422 is composed of a differentiator which is, in turn, composed of the comparator 431, capacitor C401 and resistor R401 with the plus input terminal of the comparator 431 being grounded through the resistor R401 and receiving a switching reference pulse through capacitor C401. The output terminal of the comparator 431 is connected to the base of the FET 412.

Since in the above circuit arrangement the transistors Q401 and Q402 compose a mirror circuit and has the emitter area ratio of n:1, the ratio of the collector current Iin of the transistor Q401 to that of the transistor Q402 is also n:1. Thus, the value of the voltage Vth applied from the collector of the transistor Q402 to the minus input terminal of the comparator 431 is (R402·Iin)/n, and the voltage value Vth is used as a current value signal j representing the consumed current Iin.

Figure 17:
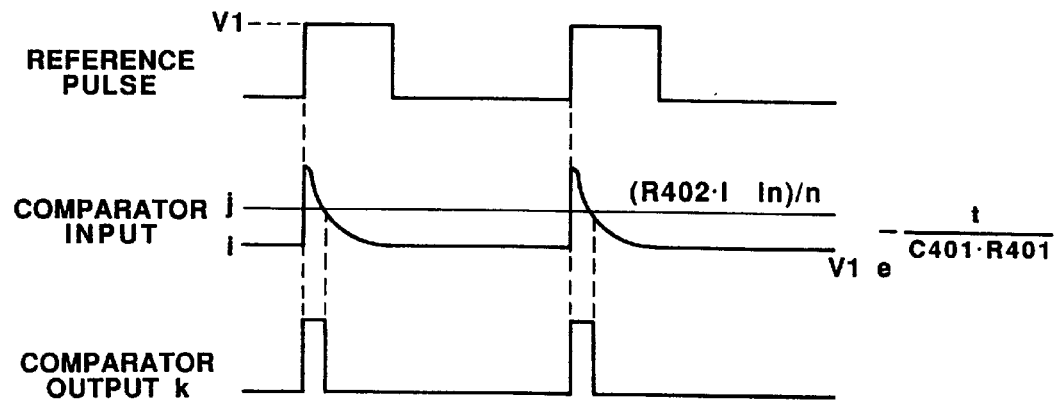
FIG. 17 shows signal waveforms in the respective appropriate elements of the driver of FIG. 16.

The comparator 431 compares a threshold voltage, which is the current value signal j shown in FIG. 17(2), with a signal i which is represented by $V1 \cdot e^{(-t/C401 \cdot R401)}$ of FIG. 17(2) obtained by differentiation of a reference pulse h having a crest value V1 of FIG. 17(1) with the capacitor C401 and the resistor R401.

Thus, the output signal k from the comparator 431 is as shown in FIG. 17. The output signal k is a wide pulse when the consumed current Iin is still low soon after the power source is turned on, and a narrower pulse as the consumed current Iin gradually increases to become stabilized. This can also be understood by obtaining the pulse width tON from the following:

$$(R402 \cdot Iin)/n = V1 \cdot e^{(-tON/C401 \; R401)}$$

That is, $$tON = -C401 \; R401 \cdot \ln((R402 \cdot Iin)/nV1)$$

It will be seen from this expression that as the consumed current Iin increases, the pulse width tON decreases.

Figure 18:
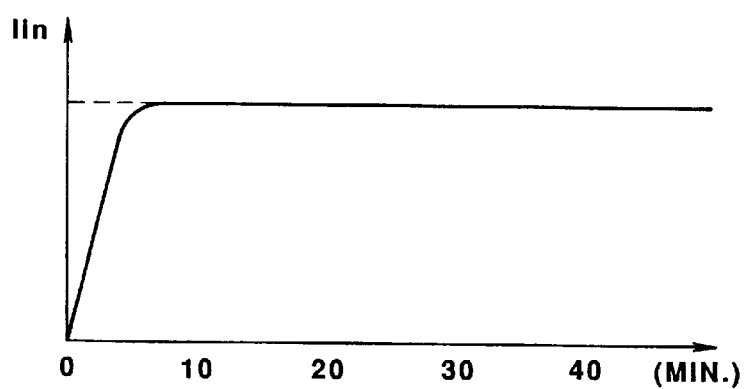
FIG. 18 shows the characteristic of a consumed current involving the third embodiment.

Variable setting of the pulse width tON in accordance with a change in the consumed current Iin, as described above, greatly reduces the time taken from directly after the power supply is turned on to the time when the consumed current Iin is stabilized, as shown in FIG. 18, and causes the backlight by the plane fluorescent panel 414 to emit with a satisfactory luminance in a short time.

While in the embodiment the width of the switching pulse is gradually changed depending on the time elapsing since the time when the power supply is turned on, for example, a two-stepped pulse width may be used in which a wide width of the switching pulse is used for a predetermined time from when the power supply is turned on and a narrower width of the pulse is employed after the lapse of the predetermined time.

As described above, according to the present embodiment, the backlight driver is provided which greatly reduces the time taken from the time when the power supply is turned on to the time when the luminance of the emitted backlight is stabilized at a satisfactory level since the width or duration of the switching pulse which drives the plane fluorescent panel intermittently in accordance with the consumed current value until the consumed current arrives at a constant level is variable and the drive time per unit time is set at a large value.

A fourth embodiment of the driver of the plane fluorescent panel according to the present invention will be described below with respect to FIGS. 19–22.

Figure 19:
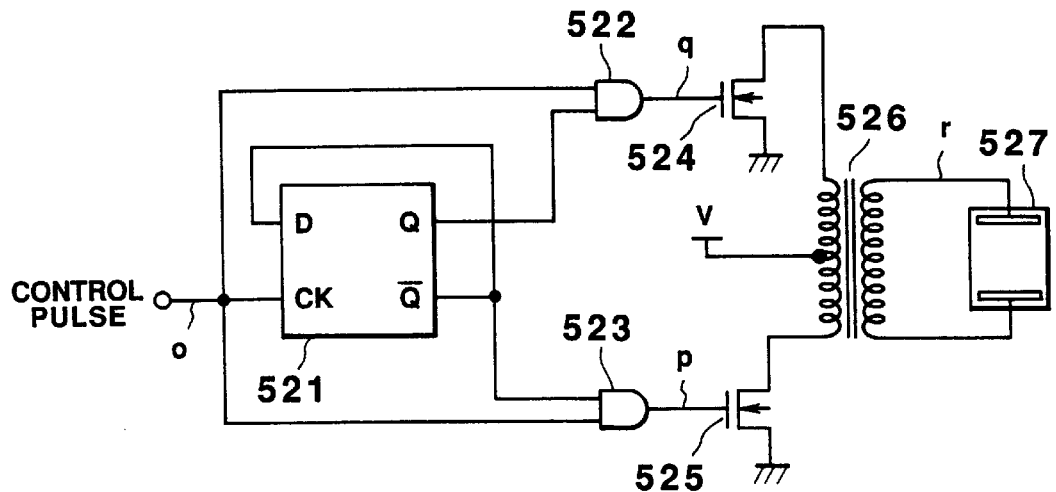
FIG. 19 shows a circuit structure of a fourth embodiment of the driver for the plane fluorescent panel according to the present invention.

FIG. 19 shows the circuit configuration of the embodiment. A control pulse o which intermittently drives a plane fluorescent panel 527 is fed to a clock terminal CK of a flip-flop (F/F) 521 and to AND gates 522 and 523. The F/F 521 feeds an output from its Q terminal to the AND gate 522 and an output from the −Q terminal which is the inverse of the output from the Q terminal to the AND gate 523 and a delay terminal D thereof.

The outputs of the AND gates 522 and 523 are fed as switching pulses q and p to the corresponding gate terminals of n-channel FETs 524 and 525, respectively, the source terminals of which are each grounded with the drain terminals of those FETs being connected to the opposite ends of the primary winding of an inverting transformer 526 which is supplied with a voltage V at its midpoint with its secondary winding being connected across the electrodes of the plane fluorescent panel 527.

Figure 20:
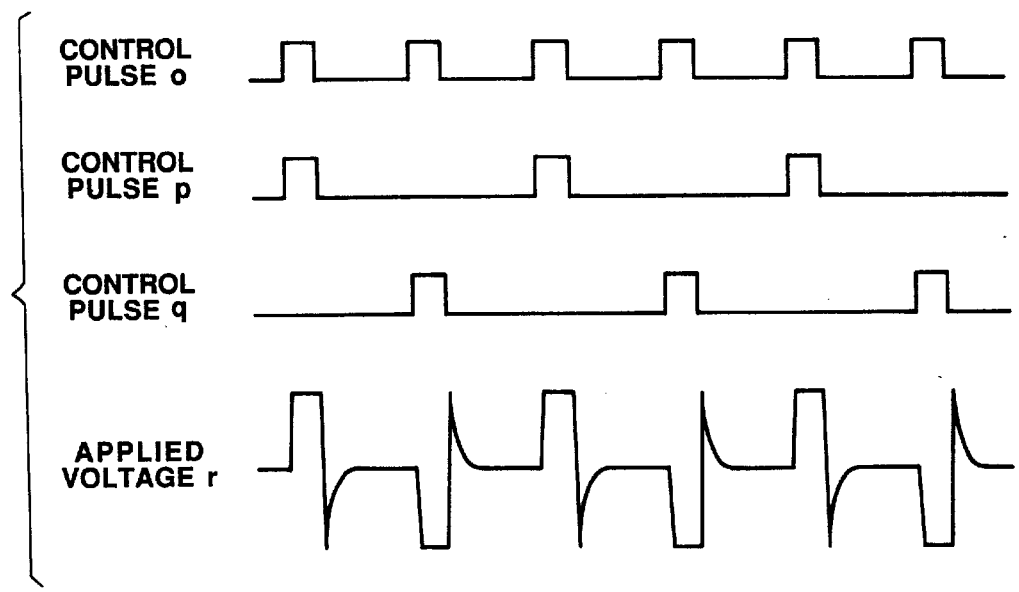
FIG. 20 shows signal waveforms in the respective appropriate elements of the driver of FIG. 19.

In such circuit configuration, the F/F 521 acts as a frequency divider which divides a control pulse signal o of FIG. 20(1), and its normal and inverted outputs which have half the frequency of the control pulse signal are used as gate control signals for the AND gates 522 and 523, respectively.

Therefore, the switching pulses q and p output from the AND gates 522 and 523 turn on the FETs 524 and 525, alternately, as shown in FIG. 20(3) and 20(2), respectively, in synchronization with the control pulse o. Thus, waveform-balanced voltages the polarities of which are alternately inverted, as shown in FIG. 20(4), are applied to the plane fluorescent panel 527.

Alternatively, a polarity switching pulse signal the polarity of which is switched at intervals of a predetermined number of pulses may be fed externally to the circuit of FIG. 19 without switching and inverting the F/F 521 in accordance with each control pulse o obtained by frequency division of the control pulse signal o in the F/F 521.

The circuitry using the polarity switching signal will be described below as a fifth embodiment of the present invention with respect to FIGS. 21 and 22.

Figure 21:
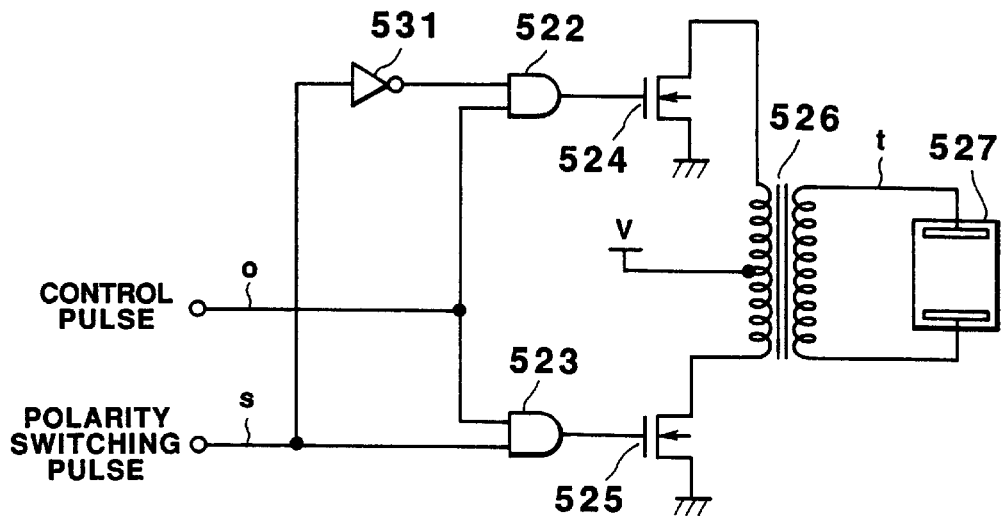
FIG. 21 shows a circuit structure of a fifth embodiment of the driver for the plane fluorescent panel according to the present invention.

FIG. 21 shows the circuit configuration of the embodiment which is the same as that of FIG. 19 except for its F/F 521, so that the same reference numeral is used to identify the same element in FIGS. 21 and 19 and further description of that element will be omitted.

A control pulse o is directly fed to AND gates 522 and 523 and a polarity switching pulse s the polarity of which is switched at intervals of a predetermined number (n) of control pulses o is fed directly to the AND gate 523 and through an invertor 531 to the AND gate 522.

Figure 22:
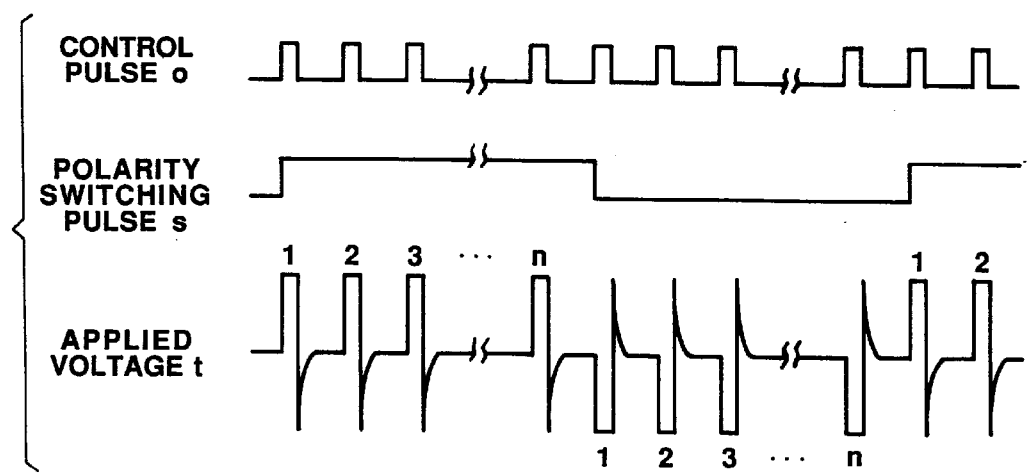
FIG. 22 shows signal waveforms in the respective appropriate elements of the fifth embodiment of FIG. 21.

Thus, the AND gates 522 and 523 output n control pulses o alternately and a voltage signal having balanced waveforms the polarity of which is inverted at every n pulses is applied across the plane fluorescent panel 527, as shown in FIG. 22(3).

Each of the AND gates used in the embodiments may be replaced with any other logic device having an AND function such as a NOR gate.

According to the fourth and fifth embodiments, the midpoint of the primary winding of the invertor transformer the secondary winding of which is connected across the fluorescent panel is supplied with the drive voltage, and both the ends of the primary winding are switched alternately to switch the polarities of the secondary winding of the invertor transformer alternately and hence balance the polarities of the voltage applied across the plane fluorescent panel. Thus, the driver is provided for the plane fluorescent panel as the backlight source which is driven in a stabilized manner to thereby increase the service life of the plane fluorescent panel.

A sixth embodiment of the driver for the plane fluorescent panel will be described below with respect to FIGS. 23 and 24.

Figure 23:
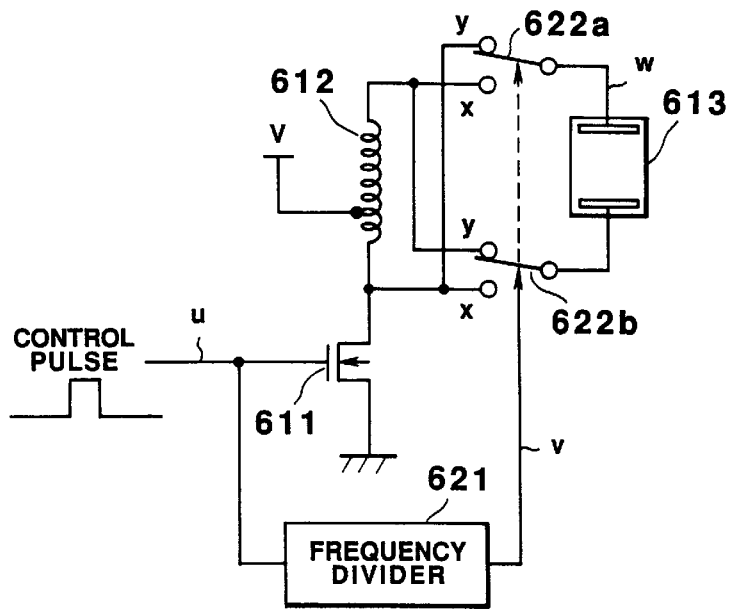
FIG. 23 shows a circuit structure of a sixth embodiment of the driver for the plane fluorescent panel according to the present invention.

FIG. 23 shows the structure of the driver for the plane fluorescent panel. A control pulse signal u which becomes high at predetermined intervals of a sufficiently short time is input to the gate terminal of a switching n-channel FET 611 and also to a frequency divider 621.

The FET 611 has a source terminal grounded and a drain terminal connected to one end of a single winding of an auto-transformer 612 with the single winding being connected through analog switches 622a and 622b across the electrodes of the fluorescent panel 613 and the single winding having thereon a point supplied with a voltage V.

The frequency divider 621 is composed, for example, of a flip-flop to divide by 2 the frequency of the control pulse signal u with the resulting signal v being used to switch the analog switches 622a and 622b.

The analog switches 622a and 622b operate simultaneously in accordance with the divided signal v to switch the connection between the plane fluorescent panel 613 and the auto-transformer 612. The analog switch 622*a* has a fixed end connected to one electrode of the plane fluorescent panel 613, and two free ends x and y connected to one end of the series winding portion of the single winding of and to one end of the branch winding of the auto-transformer 612, respectively. The analog switch 622*b* has a fixed end connected to the other electrode of the panel 613, and two free ends x and y connected to one end of the branch winding portion of the single winding of and to one end of the series winding of the auto-transformer 612, respectively.

Figure 24:
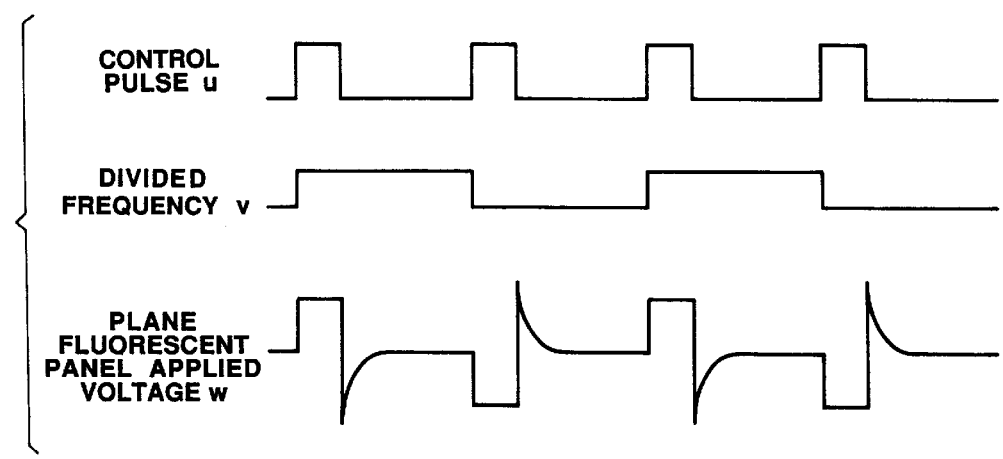
FIG. 24 shows signal waveforms in the respective appropriate elements of the sixth embodiment of FIG. 23.

When a control pulse signal u having a waveform of FIG. 24(1) is fed to the gate terminal of the FET 611 and the frequency divider 621 in the above arrangement, the frequency divider divides by 2 the frequency of the control pulse signal u to output a divided signal v of FIG. 24(2) switched sequentially between high and low levels synchronously with a rise edge of the control pulse signal u.

When the divided signal v is at high level, the fixed ends of the analog switches 622*a* and 622*b* are switched simultaneously to the corresponding free ends x while when the signal v is at low level, the fixed ends of the analog switches 622*a* and 622*b* are switched simultaneously to the corresponding free ends y. Thus, an impressed voltage w of FIG. 24(3) which inverts its polarity at each period of the control pulse signal u is applied across the plane fluorescent panel 613 for lighting and driving same.

The polarities of the voltage applied across the plane fluorescent panel 613 are balanced to thereby light and drive the plane fluorescent panel 613 in a stabilized state and hence increase its service life.

While in the present embodiment the polarity of the voltage applied across the plane fluorescent panel 613 is inverted at each period of the control pulse signal u with the signal v deriving from bi-division of the control pulse signal u by the frequency divider 621, the present invention is not limited to this embodiment. For example, the frequency of the control pulse signal u may be divided by 4 to invert the voltage applied across the plane fluorescent panel 613 at intervals of two periods of the control pulse signal u. Alternatively, a polarity switching pulse signal may be applied externally to invert the polarity of the voltage applied across the plane fluorescent panel 613 at intervals of any n periods of the control pulse signal u.

As described above, according to the present embodiment, the driver for the plane fluorescent panel includes an auto-transformer having a single winding connected across both electrodes of the plane fluorescent panel with one point on the single winding being supplied with a drive voltage, first switching means, for example, of an FET, connected to one end of a branch winding portion of the single winding and switched with a control pulse signal, a frequency divider which divides the control pulse signal, and second switching means, for example, of an analog switch, for switching the connection between the single winding and the plane fluorescent panel with the divided signal deriving from the frequency divider to invert the polarity of the voltage applied across the plane fluorescent panel at predetermined periods. Thus, a stabilized driving operation increases the light emission efficiency of the plane fluorescent panel as the light source, prevents incomplete lighting and deterioration of the plane fluorescent panel to thereby increase the service life of the panel.

While in the embodiments liquid crystal television receivers with a plane fluorescent panel are illustrated, the present invention is applicable to liquid view finders, video devices, game devices, and monitors of computers.

What is claimed is:

1. A liquid crystal television receiver with a plane fluorescent panel disposed on the side of the back of a liquid crystal display unit, comprising:
    the plane fluorescent panel disposed close to the side of the back of a liquid crystal display unit;
    a driving device for the fluorescent panel, said driving device comprising:
        a driver for driving the fluorescent panel intermittently in accordance with drive pulses of a drive pulse signal; and
        a control circuit coupled to said driver for providing said drive pulse signal to said driver, said control circuit including a timing controller which generates a first timing pulse to cause a first edge of each drive pulse of the drive pulse signal and which is a rise or fall edge of the drive pulse signal to be within a front porch of a horizontal blanking period of a video signal so as to turn on said fluorescent panel at a timing within the front porch of the horizontal blanking period, and generates a second timing pulse to cause a second edge of that drive pulse which is a fall or rise edge of that drive pulse to be within the duration of a horizontal sync pulse of the horizontal blanking period, thereby positively turning off said fluorescent panel within the duration of the horizontal sync pulse of the horizontal blanking period so that said fluorescent panel is driven to be illuminated only during the duration of the horizontal sync pulse of the horizontal blanking period.

2. A liquid crystal television receiver according to claim 1, further comprising:
    a first shielding casing for casing the display unit and disposed substantially in contact with the back of a display window framwe of a casing for a body of the television receiver; and
    a second shielding casing for casing the display unit and disposed substantially in contact with the back of said first shielding case.

3. An apparatus for displaying an image, the apparatus having a portable size case of a main body, and the apparatus comprising:
    an image signal producing means for producing an image signal;
    a liquid crystal display panel located on a surface of said case for displaying an image corresponding to said image signal produced by said image signal producing means;
    a flat fluorescent panel disposed on a back side of said liquid crystal display panel; and
    driving means, located in said case, for driving the flat fluorescent panel, said driving means comprising:
        a driver for driving the fluorescent panel intermittently in accordance with drive pulses of a drive pulse signal; and
        a control circuit coupled to said driver for providing said drive pulse signal to said driver, said control circuit including a timing controller which generates a first timing pulse to cause a first edge of each drive pulse of the drive pulse signal and which is a rise or fall edge of the drive pulse signal to be within a front porch of a horizontal blanking period of a video signal so as to turn on said fluorescent panel at a timing within the front porch of the horizontal blanking period, and generates a second timing pulse to cause a second edge of that drive pulse which is a fall or rise edge of that drive pulse to be within the duration of a horizontal sync pulse of the horizontal blanking period, thereby positively turning off said fluorescent panel within the duration of the horizontal sync pulse of the horizontal blanking period so that said fluorescent panel is driven to be illuminated only during the duration of the horizontal sync pulse of the horizontal blanking period.

4. An apparatus for displaying an image according to claim 3, further comprising:

a first shielding casing for casing the display unit and disposed substantially in contact with a back of a display window frame of a casing for a body of the apparatus; and a second shielding casing for casing the display unit and disposed substantially in contact with the back of said first shielding casing.

5. An apparatus for displaying an image according to claim 3, wherein said image signal producing means includes a television tuner.

* * * * *